(12) United States Patent
Takano et al.

(10) Patent No.: US 12,235,493 B2
(45) Date of Patent: Feb. 25, 2025

(54) SMALL FORM FACTOR FIBER OPTIC CONNECTOR WITH MULTI-PURPOSE BOOT

(71) Applicant: Senko Advanced Components, Inc., Hudson, MA (US)

(72) Inventors: Kazuyoshi Takano, Tokyo (JP); Jimmy Jun-Fu Chang, Sturbridge, MA (US)

(73) Assignee: Senko Advanced Components, Inc., Hudson, MA (US)

(*) Notice: Subject to any disclaimer, the term of this patent is extended or adjusted under 35 U.S.C. 154(b) by 0 days.

(21) Appl. No.: 18/648,893

(22) Filed: Apr. 29, 2024

(65) Prior Publication Data

US 2024/0272376 A1 Aug. 15, 2024

Related U.S. Application Data

(60) Continuation of application No. 18/171,358, filed on Feb. 19, 2023, now Pat. No. 12,001,064, which is a
(Continued)

(51) Int. Cl.
*G02B 6/38* (2006.01)
*G02B 6/40* (2006.01)
*G02B 6/42* (2006.01)

(52) U.S. Cl.
CPC ....... *G02B 6/38875* (2021.05); *G02B 6/3825* (2013.01); *G02B 6/387* (2013.01);
(Continued)

(58) Field of Classification Search
CPC .... G02B 6/387; G02B 6/3821; G02B 6/3825; G02B 6/3831
See application file for complete search history.

(56) References Cited

U.S. PATENT DOCUMENTS 3,733,576 A 5/1973 Cooper
4,645,295 A 2/1987 Pronovost
(Continued)

FOREIGN PATENT DOCUMENTS

CN 201740886 U 2/2011
JP 2573482 3/1998
(Continued)

OTHER PUBLICATIONS

Petition for Inter Partes Review of U.S. Pat. No. 11,340,413, *US Conec Ltd.*, Petitioner v. *Senko Advanced Components, Inc.*, Patent Owner, Before the Patent Trial and Appeal Board, Case IPR2024-00118, U.S. Pat. No. 11,340,413, dated Dec. 21, 2023, 131pgs.
(Continued)

*Primary Examiner* — Eric Wong

(57) ABSTRACT

An optical connector holding two or more LC-type optical ferrules is provided. The optical connector includes an outer body, an inner front body accommodating the two or more LC-type optical ferrules, ferrule springs for urging the optical ferrules towards a mating connection, and a back body for supporting the ferrule springs. A removable inner front body for polarity change is disclosed. A multi-purpose rotatable boot assembly for polarity change is disclosed. The multi-purpose boot assembly can be pushed and pulled to insert and remove the micro connector from an adapter receptacle.

19 Claims, 32 Drawing Sheets

Related U.S. Application Data continuation of application No. 17/342,988, filed on Jun. 9, 2021, now Pat. No. 11,585,989, which is a continuation of application No. 16/782,196, filed on Feb. 5, 2020, now Pat. No. 11,061,190, which is a division of application No. 16/368,828, filed on Mar. 28, 2019, now Pat. No. 10,705,300, which is a continuation of application No. 16/103,555, filed on Aug. 14, 2018, now Pat. No. 10,718,911, which is a continuation-in-part of application No. 16/035,691, filed on Jul. 15, 2018, now Pat. No. 10,281,668.

(60) Provisional application No. 62/649,539, filed on Mar. 28, 2018, provisional application No. 62/588,276, filed on Nov. 17, 2017, provisional application No. 62/549,655, filed on Aug. 24, 2017, provisional application No. 62/532,710, filed on Jul. 14, 2017.

(52) U.S. Cl.
CPC ......... *G02B 6/3879* (2013.01); *G02B 6/3887* (2013.01); *G02B 6/3893* (2013.01); *G02B 6/403* (2013.01); *G02B 6/406* (2013.01); *G02B 6/4292* (2013.01); *G02B 6/3821* (2013.01)

(56) References Cited

U.S. PATENT DOCUMENTS

| | | |
|---|---|---|
| 5,181,267 A | 1/1993 | Gerace et al. |
| 5,222,168 A | 6/1993 | Saito et al. |
| 5,390,272 A | 2/1995 | Repta et al. |
| 5,528,712 A | 6/1996 | Belenkiy et al. |
| 5,615,293 A | 3/1997 | Sayegh |
| 5,673,346 A | 9/1997 | Iwano et al. |
| 5,719,977 A | 2/1998 | Lampert et al. |
| 5,915,058 A | 6/1999 | Clairardin et al. |
| 6,146,023 A | 11/2000 | Weigel |
| 6,149,313 A | 11/2000 | Giebel et al. |
| 6,220,762 B1 | 4/2001 | Kanai et al. |
| 6,224,268 B1 | 5/2001 | Manning et al. |
| 6,305,961 B1 | 10/2001 | Szilagyi et al. |
| 6,331,079 B1 | 12/2001 | Grois et al. |
| 6,357,931 B1 | 3/2002 | Shirakawa et al. |
| 6,371,659 B1 | 4/2002 | Weigel |
| 6,386,768 B1 | 5/2002 | Yoon et al. |
| 6,419,399 B1 | 7/2002 | Loder et al. |
| 6,450,695 B1 | 9/2002 | Matsumoto |
| 6,511,230 B1 | 1/2003 | Connelly et al. |
| 6,568,861 B2 | 5/2003 | Benner et al. |
| 6,575,640 B2 | 6/2003 | Connelly et al. |
| 6,715,928 B1 | 4/2004 | Matasek et al. |
| 6,764,222 B1 | 7/2004 | Szilagyi et al. |
| 6,796,715 B2 | 9/2004 | Chiu et al. |
| 6,918,704 B2 | 7/2005 | Marrs et al. |
| 6,929,406 B2 | 8/2005 | Amorim |
| 7,001,081 B2 | 2/2006 | Cox et al. |
| 7,150,567 B1 | 12/2006 | Luther et al. |
| 7,204,644 B2 | 4/2007 | Barnes et al. |
| 7,284,912 B2 | 10/2007 | Suzuki et al. |
| 7,347,634 B2 | 3/2008 | Günther et al. |
| 7,500,790 B2 | 3/2009 | Erdman et al. |
| 7,628,545 B2 | 12/2009 | Cody et al. |
| 7,677,812 B2 | 3/2010 | Castagna et al. |
| 8,061,906 B2 | 11/2011 | Nehler et al. |
| 8,406,597 B2 | 3/2013 | Case |
| 8,465,317 B2 | 6/2013 | Gniadek et al. |
| 8,556,646 B2 | 10/2013 | Kappla et al. |
| 8,636,424 B2 | 1/2014 | Kuffel et al. |
| 8,641,293 B2 | 2/2014 | Lin et al. |
| 8,662,760 B2 | 3/2014 | Cline et al. |
| 8,764,308 B2 | 7/2014 | Irwin et al. |
| 8,834,038 B2 | 9/2014 | Limbert et al. |
| 8,858,089 B2 | 10/2014 | Bradley |
| 9,366,829 B2 | 6/2016 | Czosnowski et al. |
| 9,411,111 B2 | 8/2016 | Banal, Jr. et al. |
| 9,557,495 B2 | 1/2017 | Raven et al. |
| 9,568,689 B2 | 2/2017 | Nguyen et al. |
| 9,599,778 B2 | 3/2017 | Wong et al. |
| 9,625,658 B1 | 4/2017 | Lin |
| 9,684,130 B2 | 6/2017 | Veatch et al. |
| 10,156,683 B2 | 12/2018 | Manes et al. |
| 10,156,684 B2 | 12/2018 | Nguyen et al. |
| 10,191,230 B2 | 1/2019 | Wong et al. |
| 10,495,823 B2 | 12/2019 | Good et al. |
| 10,890,723 B2 | 1/2021 | Nguyen et al. |
| 11,061,190 B2 | 7/2021 | Takano et al. |
| 11,181,701 B2 | 11/2021 | Wong et al. |
| 11,307,369 B2 | 4/2022 | Takano et al. |
| 11,333,836 B2 | 5/2022 | Wong et al. |
| 11,340,405 B2 | 5/2022 | Hendrick |
| 11,385,415 B2 | 7/2022 | Nguyen et al. |
| 11,415,760 B2 | 8/2022 | Takano et al. |
| 11,428,875 B2 | 8/2022 | Nguyen et al. |
| 11,525,965 B2 | 12/2022 | Childers et al. |
| 11,719,893 B2 | 8/2023 | Higley et al. |
| 11,733,466 B2 | 8/2023 | Higley et al. |
| 11,808,994 B1 | 11/2023 | Higley et al. |
| 11,846,813 B2 | 12/2023 | Childers et al. |
| 11,880,075 B1 | 1/2024 | Nguyen et al. |
| 11,906,794 B2 | 2/2024 | Higley et al. |
| 2003/0118293 A1 | 6/2003 | Canace et al. |
| 2003/0147230 A1 | 8/2003 | Hutermans et al. |
| 2004/0043654 A1 | 3/2004 | Lee et al. |
| 2004/0078961 A1 | 4/2004 | Chen et al. |
| 2004/0247252 A1 | 12/2004 | Ehrenreich et al. |
| 2005/0111796 A1 | 5/2005 | Matasek et al. |
| 2005/0135752 A1 | 6/2005 | Kiani et al. |
| 2005/0135753 A1 | 6/2005 | Eigenmann et al. |
| 2005/0136722 A1 | 6/2005 | Cairns |
| 2005/0281509 A1 | 12/2005 | Cox et al. |
| 2008/0037938 A1 | 2/2008 | Kiani et al. |
| 2008/0144303 A1 | 6/2008 | Ice |
| 2008/0260333 A1 | 10/2008 | Roth |
| 2010/0284656 A1 | 11/2010 | Morra et al. |
| 2011/0019962 A1 | 1/2011 | Childers et al. |
| 2011/0091159 A1 | 4/2011 | de Jong et al. |
| 2011/0299814 A1 | 12/2011 | Nakagawa |
| 2012/0057824 A1 | 3/2012 | Katoh |
| 2012/0057826 A1 | 3/2012 | Katoh |
| 2012/0082416 A1 | 4/2012 | Katoh |
| 2012/0099822 A1 | 4/2012 | Kuffel |
| 2012/0141072 A1 | 6/2012 | Katagiyama et al. |
| 2012/0177326 A1 | 7/2012 | Peng et al. |
| 2012/0213484 A1 | 8/2012 | Childers et al. |
| 2013/0094816 A1 | 4/2013 | Lin et al. |
| 2013/0122745 A1 | 5/2013 | Soubh et al. |
| 2013/0308916 A1 | 11/2013 | Buff |
| 2013/0322825 A1 | 12/2013 | Cooke et al. |
| 2013/0322826 A1 | 12/2013 | Henke et al. |
| 2014/0169727 A1* | 6/2014 | Veatch ................ G02B 6/3879 385/11 |
| 2014/0241689 A1 | 8/2014 | Bradley et al. |
| 2015/0177463 A1* | 6/2015 | Lee ..................... G02B 6/3879 385/76 |
| 2016/0161680 A1 | 6/2016 | Nguyen et al. |
| 2016/0178850 A1 | 6/2016 | Nhep |
| 2016/0202431 A1 | 7/2016 | Hill et al. |
| 2016/0238796 A1 | 8/2016 | Nguyen et al. |
| 2016/0327756 A1 | 11/2016 | Raven et al. |
| 2017/0153879 A1 | 6/2017 | George et al. |
| 2017/0205587 A1 | 7/2017 | Chang et al. |
| 2017/0205588 A1 | 7/2017 | Lee |
| 2017/0227720 A1 | 8/2017 | Lin |
| 2017/0343740 A1 | 11/2017 | Nguyen |
| 2017/0351037 A1 | 12/2017 | Watanabe et al. |
| 2017/0363818 A1 | 12/2017 | Suzic |
| 2018/0106972 A1 | 4/2018 | Liu et al. |
| 2018/0156988 A1* | 6/2018 | Gniadek ............ H01R 13/743 |
| 2018/0217340 A1* | 8/2018 | Wong ................ G02B 6/3893 |
| 2018/0224608 A1 | 8/2018 | Liu et al. |
| 2018/0252872 A1 | 9/2018 | Chen |
| 2019/0018201 A1 | 1/2019 | Takano et al. |

(56) References Cited

U.S. PATENT DOCUMENTS

| | | | |
|---|---|---|---|
| 2019/0018209 | A1 | 1/2019 | Takano et al. |
| 2019/0179089 | A1* | 6/2019 | Takano ................. G02B 6/3893 |
| 2019/0204513 | A1 | 7/2019 | Davidson et al. |
| 2019/0243072 | A1 | 8/2019 | Takano et al. |
| 2020/0150357 | A1* | 5/2020 | Higley ................. G02B 6/3888 |
| 2020/0285005 | A1 | 9/2020 | Watanabe et al. |
| 2021/0099229 | A1 | 4/2021 | Cox et al. |
| 2021/0149120 | A1* | 5/2021 | Wong ................... G02B 6/3893 |
| 2023/0213709 | A1 | 7/2023 | Higley et al. |
| 2023/0393351 | A1 | 12/2023 | Childers et al. |

FOREIGN PATENT DOCUMENTS

| | | | |
|---|---|---|---|
| JP | 2001305391 A | 10/2001 | |
| JP | 2004-354693 A | 12/2004 | |
| JP | 3886610 B2 | 2/2007 | |
| JP | 2012-53375 A | 3/2012 | |
| WO | WO2012/174227 A2 | 12/2012 | |
| WO | WO2013/100892 A1 | 7/2013 | |
| WO | WO2014/057264 A2 | 4/2014 | |
| WO | WO2015/027033 A1 | 2/2015 | |
| WO | WO2017/127208 A1 | 7/2017 | |
| WO | WO2018/042775 A1 | 3/2018 | |
| WO | WO2019126337 A1 | 6/2019 | |
| WO | WO2002/042818 A1 | 5/2022 | |

OTHER PUBLICATIONS

Fibermart, "Fiber Optic Connector Tutorial," accessed on the internet at https://www.fiber-mart.com/news/fiber-optic-connector-tutorial-a-848.html, retrieved Dec. 21, 2023, 5pgs.
"Fiber Optic Rack Mount Enclosure, 3-Panel 1 RMS," accessed on the internet at https://www.computercablestore.com/fiber-optic-rack-mount-enclosure-3-panel-1-rms, retrieved Dec. 21, 2023, 4pgs.
Liteon, "19-Inch Rack," accessed on the internet at https://liteon-cips.com/products/racks/19-inch-rack/, retrieved Dec. 21, 2023, 5pgs.
Wagner et al., "SC-DC/SC-QC fiber optic connector," Opt. Eng., 37(12) 3129-3133, Dec. 1998.
Wenke, "Report on Fiber Optic Cables," Optical Communication ONT, Hochschule Bremen, City University of Applied Sciences, pp. 1-30, Dec. 18, 2015.
Kant, "Data center evolution a tutorial on state of the art, issues, and challenges," Computer Networks, 53:2939-2965, 2009.
Curran et al. "Basics of Fiber Optics," Amphenol Fiber Systems International, pp. 1-13, dated no later than Jan. 11, 2024.
Nishimura et al., "High-Density Multi-Fiber Connectors for Optical Interconnection," Furukawa Review, 34:13-16, Aug. 29, 2008.
Gurreri et al, "Multi-Fiber, MT Ferrule Endface Fiber Tip Displacement Model for Physical Contact Interconnects," 2006, pp. 1-12.
Declaration of James F. Brennan III, Ph.D. in Support of Petition for Inter Partes Review of U.S. Pat. No. 11,340,413, *US Conec Ltd.*, Petitioner v. *Senko Advanced Components, Inc.*, Patent Owner, Before the Patent Trial and Appeal Board, Case IPR2024-00118, U.S. Pat. No. 11,340,413, dated Dec. 21, 2023, 294pgs.
Petition for Inter Partes Review of U.S. Pat. No. 10,191,230, *US Conec Ltd.*, Petitioner v. *Senko Advanced Components, Inc.*, Patent Owner, Before the Patent Trial and Appeal Board, Case IPR2024-00120, U.S. Pat. No. 10,191,230 B2, dated Dec. 22, 2023, 177pgs.
"HDI-45 connector," accessed on the internet at https://en.wikipedia.org/wiki/HDI-45_connector, retrieved Dec. 22, 2023, 4pgs.
Google Data Centers gallery, accessed on the internet at https://www.google.com/about/datacenters/gallery/, retrieved Dec. 24, 2023, 83pgs.
Order Staying Case, *Senko Advanced Components, Inc.* vs. *US Conec Ltd.*, In the United States District Court for the District of Delaware, C.A. No. 23-083 (JPM), Jul. 6, 2023, 2pgs.
Kordz, "RJ45 CAT6 Field Termination Connector & & Strain Relief," Technical Data Sheet, kordz.com, 2019, 2pgs.
"Machine Design—An Integrated Approach," 3rd Edition, Pearson College Div, Jan. 1, 2005, 93pgs.

Declaration of William Singhose, PH.D. in Support of Petition for Inter Partes Review of U.S. Pat. No. 10,191,230, *US Conec Ltd.*, Petitioner v. *Senko Advanced Components, Inc.*, Patent Owner, Before the Patent Trial and Appeal Board, Case IPR2024-00120, U.S. Pat. No. 10,191,230 B2, dated Dec. 19, 2023, 342pgs.
Petition for Inter Partes Review of U.S. Pat. No. 11,385,415, *US Conec Ltd.*, Petitioner v. *Senko Advanced Components, Inc.*, Patent Owner, Before the Patent Trial and Appeal Board, Case IPR2024-00805, U.S. Pat. No. 11,385,415, dated Apr. 12, 2024, 207pgs.
Scheduling Order, *Senko Advanced Components, Inc.* vs. *US Conec Ltd.*, In the United States District Court for the District of Delaware, Case No. 1:23-cv-00083-JPM, Mar. 12, 2024, 9pgs.
Declaration of Edward Lurie, *Senko Advanced Components, Inc.*, Petitioner v. *US Conec Ltd.*, Patent Owner, Before the Patent Trial and Appeal Board, Case IPR2024-00805, U.S. Pat. No. 11,385,415, dated Apr. 11, 2024, 386pgs.
U.S. Appl. No. 61/789,499, filed Mar. 15, 2013, 32pgs.
Petition for Inter Partes Review of U.S. Pat. No. 11,181,701, *US Conec Ltd.*, Petitioner v. *Senko Advanced Components, Inc.*, Patent Owner, Before the Patent Trial and Appeal Board, Case IPR2024-00121, U.S. Pat. No. 11,181,701, dated Dec. 28, 2023, 112pgs.
"Maelstrom (ride)," Wikipedia, accessed on the internet at https://en.wikipedia.org/wiki/Maelstrom_(ride), retrieved Dec. 27, 2023, 3pgs.
Declaration of William Singhose, PH.D. in Support of Petition for Inter Partes Review of U.S. Pat. No. 11,181,701, *US Conec Ltd.*, Petitioner v. *Senko Advanced Components, Inc.*, Patent Owner, Before the Patent Trial and Appeal Board, Case IPR2024-00121, U.S. Pat. No. 11,181,701, dated Dec. 27, 2023, 330pgs.
"Fiber Optic adapter/Coupler Tutorial," accessed on the internet at https://community.fs.com/article/fiber-optic-adaptercoupler-tutorial.html, retrieved Dec. 21, 2023, 4pgs.
"What Is Optical Fiber Technology, and How Does It Work?," accessed on the internet at https://www.nai-group.com/optical-fiber-technology-how-it-works/, retrieved Dec. 21, 2023, 8pgs.
Petition for Inter Partes Review of U.S. Pat. No. 11,333,836, *US Conec Ltd.*, Petitioner v. *Senko Advanced Components, Inc.*, Patent Owner, Before the Patent Trial and Appeal Board, Case IPR2024-00117, U.S. Pat. No. 11,333,836, dated Dec. 30, 2023, 131pgs.
U.S. Appl. No. 62/546,920, filed Aug. 17, 2017, 76pgs.
U.S. Appl. No. 62/458,042, filed Feb. 13, 2017, 22pgs.
U.S. Appl. No. 62/463,898, filed Feb. 27, 2017, 87pgs.
U.S. Appl. No. 62/457,150, filed Feb. 9, 2017, 76pgs.
U.S. Appl. No. 62/463,901, filed Feb. 27, 2017, 87pgs.
Moxel Adaptor, dated no later than Apr. 22, 2024, 1pg.
Hendrick, "Interface Specification for MDC Receptacle," Feb. 6, 2020, 7pgs.
Declaration of William Singhose, PH.D. in Support of Petition for Inter Partes Review, *US Conec Ltd.*, Petitioner v. *Senko Advanced Components, Inc.*, Patent Owner, Before the Patent Trial and Appeal Board, Case IPR2024-00117, U.S. Pat. No. 11,333,836, 225pgs.
Fiberoad, "QSFP-DD releases Interface Specification," accessed on the internet at https://fiberroad.com/400g-qsfpdd-dco-standards/, retrieved Dec. 30, 2023, 3pgs.
Cabling, "QSFP-DD MSA Group intros new specs, plus white paper," accessed on the internet at https://www.cablinginstall.com/standards/article/14203903/qsfp-dd-msa-group-intros-new-specs-plus-white-paper, retrieved Dec. 30, 2023, 3pgs.
Lightwave, "QSFP-DD MSA Group offers rev 6.0 specifications for QSFPDDS00, QSFP112," accessed on the internet at https://www.lightwaveonline.com/optical-tech/transmission/article/14204021/qsfp-dd-msa-group-offers-rev-60-specifications-for-qsfp-dd800-qsfp112, retrieved Dec. 30, 2023, 4pgs.
Jenkins et al., "Controlling Human Perception of Haptic Profiles Using Contextual Cues," 2023 IEEE World Haptics Conference (WHC), WHC 2023, Delft, Netherlands, Jul. 10-13, 2023, pp. 1-7.
Petition for Inter Partes Review of U.S. Pat. No. 11,415,760, *US Conec Ltd.*, Petitioner v. *Senko Advanced Components, Inc.*, Patent Owner, Before the Patent Trial and Appeal Board, Case IPR2024-00119, U.S. Pat. No. 11,415,760, dated Jan. 3, 2024, 126pgs.
Patent Owner's Preliminary Response to the Petition for Inter Partes Review, *US Conec Ltd.*, Petitioner v. *Senko Advanced Components,*

(56) References Cited

OTHER PUBLICATIONS

*Inc.*, Patent Owner, Before the Patent Trial and Appeal Board, Case IPR2024-00119, U.S. Pat. No. 11,415,760, dated Apr. 18, 2024, 42pgs.
Assignment of U.S. Appl. No. 14/996,865, Takano, Gniadek to Senko Advanced Components, Inc., dated Jan. 15, 2016, 3pgs.
Assignment of U.S. Appl. No. 14/521,414, Wong, Ruffner to Senko Advanced Components, Inc., dated Apr. 23, 2015, 8pgs.
Declaration of Eric Pearson, *US Conec Ltd.*, Petitioner v. *Senko Advanced Components, Inc.*, Patent Owner, Before the Patent Trial and Appeal Board, Case IPR2024-00119, U.S. Pat. No. 11,415,760, dated Apr. 17, 2024, 35pgs.
The New. Oxford American Dictionary, $2^{nd}$ ed., Cover and Bibliographic pages, p. 1596 "Slickenslide—Slip," 2005, 4pgs.
Meriam Webster's Collegiate Dictionary, $11^{th}$ ed., Cover and Bibliographic pages, p. 1172 "sleep-slider," 2012, 4pgs.
Webster's New International Dictionary of the English Language, $2^{nd}$ ed., p. 2364, "Slick-Slight," 1947, 4pgs.
Satake, "The History of the MT and its Variations," accessed on the internet at IEEE Xplore, retrieved Oct. 30, 2023, 2pgs.
Nissin Kasei USA Corp., "MPO Connector Kit, Product Specifications," dated no later than Apr. 22, 2024, 9pgs.
Furukawa Electric, "MT Ferrules," accessed on the internet at https://www.furukawa.eo.jp/telecom/en/product/connector/product/mt.html#:-:text=MT ferrules are key components,wealth of technology and experience., retrieved Nov. 1, 2023, 4pgs.
OCC, "18 Port Rack Mount Fiber Enclosure," accessed on the internet at https://www.computercablestore.com/18-port-rack-mount-fiber-enclosure, retrieved Dec. 18, 2023, 4pgs.
"Rack unit," accessed on the internet https://en.wikipedia.org/wiki/Rack_unit, retrieved Oct. 24, 2023, 5pgs.
Declaration of James F. Brennan III, Ph.D. in Support of Petition for Inter Partes Review, *US Conec Ltd.*, Petitioner v. *Senko Advanced Components, Inc.*, Patent Owner, Before the Patent Trial and Appeal Board, Case IPR2024-00119, U.S. Pat. No. 11,415,760, dated Jan. 3, 2024, 281pgs.
Petition for Inter Partes Review of U.S. Pat. No. 11,061,190, *US Conec Ltd.*, Petitioner v. *Senko Advanced Components, Inc.*, Patent Owner, Before the Patent Trial and Appeal Board, Case IPR2024-00122, U.S. Pat. No. 11,061,190, dated Jan. 4, 2024, 147pgs.
Patent Owner's Preliminary Response to the Petition for Inter Partes Review, *US Conec Ltd.*, Petitioner v. *Senko Advanced Components, Inc.*, Patent Owner, Before the Patent Trial and Appeal Board, Case IPR2024-00122, U.S. Pat. No. 11,061,190, dated Mar. 27, 2024, 93pgs.
International Standard, "Fibre optic interconnecting devices and passive components—Fibre optic connector interfaces—Part 20: Type LC connector family," Ed. 2.0, Apr. 2012, 30pgs.
Senko, "The Importance of Proper Crimping in Fiber Optic Assemblies," Application Note, Rev. 01, pp. 1-9, Feb. 2021.
Buijs, Marcel, Fiber Optic Center, "Proper Crimping Techniques are Critical When Terminating Fiber Optic Connectors," FOC Blogs, accessed on the internet https://focenter.com/blog/proper-crimping-techniques-are-critical-when-terminating-fiber-optic-connectors, retrieved Feb. 20, 2024, 7pgs.
Bulgin, "Terminating and crimping for fiber optics:methods and tips," Nov. 25, 2019, accessed on the internet https://community.element14.com/products/manufacturers/bulgin/b/blog/posts/terminating-and-crimping-for-fiber-optics-methods-and-tips, retrieved Feb. 20, 2024, 4pgs.
Cambridge English Dictionary, "Meaning of elongate in English," accessed on the internet https://dictionary.cambridge.org/us/dictionary/english/elongate, retrieved Feb. 20, 2024, 8pgs.
Declaration of Eric Pearson, *US Conec Ltd.*, Petitioner v. *Senko Advanced Components, Inc.*, Patent Owner, Before the Patent Trial and Appeal Board, Case IPR2024-00122, U.S. Pat. No. 11,061,190, dated Mar. 26, 2024, 115pgs.
Leviton, "Application Note: Understanding Duplex Polarity," 2020, 3pgs.

L-com Fiber Coupler, LC Duplex Bronze Sleeve, Low Profile (SKU_ FOA-802), dated no later than Apr. 22, 2024, 1pg.
Huber+Suhner LC-XD Connector, dated no later than Apr. 22, 2024, 2pgs.
PolyPhaser Fiber Optic Patch Cord Duplex Uniboot LC to LC Single Mode Fiber, OFNR, Yellow 3.0mm Jacket, 5m (SKU_ FPC2LCLC-USMRY30-05), dated no later than Apr. 22, 2024, 2pgs.
Universal LC Fiber Cable—Singlemode 9_125—Plenum 4M with Uniboot LC Connectors (SKU_FODULC-SNG-4m), dated no later than Apr. 22, 2024, 10pgs.
Declaration of James F. Brennan III, Ph.D. in Support of Petition for Inter Partes Review of U.S. Pat. No. 11,061,190, *US Conec Ltd.*, Petitioner v. *Senko Advanced Components, Inc.*, Patent Owner, Before the Patent Trial and Appeal Board, U.S. Pat. No. 11,061,190, IPR2024-00122, dated Jan. 4, 2024, 271pgs.
Petition [1 of 2] for Inter Partes Review of U.S. Pat. No. 11,307,369 [Claims 1-22], *US Conec Ltd.*, Petitioner v. *Senko Advanced Components, Inc.*, Patent Owner, Before the Patent Trial and Appeal Board, Case IPR2024-00115, U.S. Pat. No. 11,307,369, dated Jan. 6, 2024, 121pgs.
Petition [2 of 2] for Inter Partes Review of U.S. Pat. No. 11,307,369 [Claims 23-40], *US Conec Ltd.*, Petitioner v. *Senko Advanced Components, Inc.*, Patent Owner, Before the Patent Trial and Appeal Board, Case IPR2024-00116, U.S. Pat. No. 11,307,369, dated Jan. 6, 2024, 126pgs.
Declaration of James F. Brennan III, Ph.D. in Support of Petition for Inter Partes Review of Claims 23-40 of U.S. Pat. No. 11,307,369, *US Conec Ltd.*, Petitioner v. *Senko Advanced Components, Inc.*, Patent Owner, Before the Patent Trial and Appeal Board, Case IPR2024-00116, U.S. Pat. No. 11,307,369, dated Jan. 5, 2024, 257pgs.
Declaration of James F. Brennan III, Ph.D. in Support of Petition for Inter Partes Review of Claims 1-22 of U.S. Pat. No. 11,307,369, *US Conec Ltd.*, Petitioner v. *Senko Advanced Components, Inc.*, Patent Owner, Before the Patent Trial and Appeal Board, Case IPR2024-00115, U.S. Pat. No. 11,307,369, dated Jan. 5, 2024, 256pgs.
Decision Denying Institution of Inter Partes Review, *US Conec Ltd. V. Senko Advanced Components Inc*, Before the Patent Trial and Appeal Board, Case IPR2024-00122, U.S. Pat. No. 11,061,190, Jun. 5, 2024, 23 pages.
White Paper: SC-RJ—Reliability for Every Category, 2008, 14 pages.
Petition for Post-Grant Review of U.S. Pat. No. 11,733,466, *Senko Advanced Components v. US Conec LTD*, Case PGR2024-00032, May 21, 2024, 242 pages.
Declaration of Edward Lurie, *Senko Advanced Components v. US Conec LTD*, Case PGR2024-00032, U.S. Pat. No. 11,733,466, May 19, 2024, 310 pages.
U.S. Appl. No. 62/532,710, filed Jul. 14, 2017, 79 pages.
QSFP-DD Hardware Specification, Sep. 19, 2017, 69 pages.
TIA/EI Standard, FOCIS 10 Fiber Optic Connector Intermateability Standard—Type LC, 2002, 38 pages.
CS Connector, May 20, 2024, 8 pages.
Exhibit I, US Conec EX1007, IPR2024-00116, U.S. Pat. No. 11,307,369, dated no later than Apr. 22, 2024; 4pgs.
BSI Standards Publication, Fibre Optic Interconnecting Devices and Components, Part 24, Jan. 2010, 32pgs.
INTL Standard 61754-4 ed1.2b Connector interfaces SC connector, Mar. 2002, 92pgs.
Declaration of Edward M. Cady, Jr., *Senko Advanced Components, Inc.*, Petitioner v. *US Conec Ltd.*, Patent Owner, Before the Patent Trial and Appeal Board, Case IPR2024-01074, U.S. Pat. No. 11,880,075, dated Jun. 19, 2024, 258pgs.
Petition for Inter Partes Review of U.S. Pat. No. 11,880,075, *Senko Advanced Components, Inc.*, Petitioner v. *US Conec Ltd.*, Patent Owner, Before the Patent Trial and Appeal Board, Case IPR2024-01074, U.S. Pat. No. 11,880,075, dated Jun. 20, 2024, 159pgs.
Representative Claim Chart Showing Infringement of U.S. Pat. No. 11,880,075, Mar. 22, 2024, 67pgs.

(56) References Cited

OTHER PUBLICATIONS

Declaration of Edward Lurie, *Senko Advanced Components, Inc.*, Petitioner v. *US Conec Ltd.*, Patent Owner, Before the Patent Trial and Appeal Board, Case PGR2024-00037, U.S. Pat. No. 11,906,794, dated Jun. 14, 2024, 311pgs.
Petition for Post-Grant Review of U.S. Pat. No. 11,906,794, *Senko Advanced Components, Inc.*, Petitioner v. *US Conec Ltd.*, Patent Owner, Before the Patent Trial and Appeal Board, Case PGR2024-00037, U.S. Pat. No. 11,906,794, dated Jun. 20, 2024, 270pgs.
U.S. Appl. No. 62/649,539, filed Mar. 28, 2018, 209pgs.
U.S. Appl. No. 62/640,914, filed Mar. 9, 2018, 41pgs.
Senko Advanced Components, "The Importance of Proper Cleaving for Fiber Optic Connectors," Application Engineering Note, Feb. 2022, 10pgs.
Thorlabs, Guide to Connectorization and Polishing Optical Fibers, FN96A, Apr. 17, 2013, 36pgs.
Designerdata Polypropylene, accessed on the internet at https://designerdata.nl/materials/plastics/thermo-plastics/polypropylene-(cop.)?cookie=YES, retrieved Apr. 28, 2024, 2pgs.
Typical Engineering Properties of Polypropylene, INEOS Olefins & Polymers USA, accessed on the internet at www.ineos-op.com, Apr. 2014, 2pgs.
The Engineering ToolBox: Polymers, accessed on the internet at https://www.engineeringtoolbox.com/polymer-properties-d_1222.html, retrieved Apr. 28, 2024, 9pgs.
Omnexus Plastics & Elastomers, accessed on the internet at https://omnexus.specialchem.com/polymer-property/young-modulus, retrieved Apr. 28, 2024, 14pgs.
U.S. Appl. No. 62/793,198, filed Jan. 16, 2019, 55pgs.
U.S. Appl. No. 62/653,706, filed Apr. 6, 2018, 19pgs.
Exhibit A-1—U.S. Pat. No. 11,733,466 Invalidity Claim Chart, Jun. 21, 2024, 55pgs.
Exhibit A-2—U.S. Pat. No. 11,733,466 Invalidity Claim Chart, Jun. 21, 2024, 43pgs.
Exhibit A-3—U.S. Pat. No. 11,733,466 Invalidity Claim Chart, Jun. 21, 2024, 49pgs.
Exhibit A-4—U.S. Pat. No. 11,733,466 Invalidity Claim Chart, Jun. 21, 2024, 37pgs.
Exhibit B-1—U.S. Pat. No. 11,808,994 Invalidity Claim Chart, Jun. 21, 2024, 38pgs.
Exhibit B-2—U.S. Pat. No. 11,808,994 Invalidity Claim Chart, Jun. 21, 2024, 64pgs.
Exhibit B-3—U.S. Pat. No. 11,808,994 Invalidity Claim Chart, Jun. 21, 2024, 68pgs.
Exhibit B-4—U.S. Pat. No. 11,808,994 Invalidity Claim Chart, Jun. 21, 2024, 53pgs.
Exhibit C-1—U.S. Pat. No. 11,906,794 Invalidity Claim Chart, Jun. 21, 2024, 105pgs.
Exhibit C-2—U.S. Pat. No. 11,906,794 Invalidity Claim Chart, Jun. 21, 2024, 98pgs.
Exhibit C-3—U.S. Pat. No. 11,906,794 Invalidity Claim Chart, Jun. 21, 2024, 105pgs.
Exhibit C-4—U.S. Pat. No. 11,906,794 Invalidity Claim Chart, Jun. 21, 2024, 33pgs.
Exhibit C-5—U.S. Pat. No. 11,906,794 Invalidity Claim Chart, Jun. 21, 2024, 39pgs.
Exhibit C-6—U.S. Pat. No. 11,906,794 Invalidity Claim Chart, Jun. 21, 2024, 22pgs.
Exhibit D-1—U.S. Pat. No. 11,880,075 Invalidity Claim Chart, Jun. 21, 2024, 90pgs.
Exhibit D-2—U.S. Pat. No. 11,880,075 Invalidity Claim Chart, Jun. 21, 2024, 91pgs.
Exhibit D-3—U.S. Pat. No. 11,880,075 Invalidity Claim Chart, Jun. 21, 2024, 86pgs.
Exhibit E-1—U.S. Pat. No. 11,385,415 Invalidity Claim Chart, Jun. 21, 2024, 50pgs.
Exhibit E-2—U.S. Pat. No. 11,385,415 Invalidity Claim Chart, Jun. 21, 2024, 25pgs.
Exhibit E-3—U.S. Pat. No. 11,385,415 Invalidity Claim Chart, Jun. 21, 2024, 57pgs.
Exhibit E-4—U.S. Pat. No. 11,385,415 Invalidity Claim Chart, Jun. 21, 2024, 57pgs.
Exhibit E-5—U.S. Pat. No. 11,385,415 Invalidity Claim Chart, Jun. 21, 2024, 8pgs.
Exhibit F-1—U.S. Pat. No. 10,495,823 Invalidity Claim Chart, Jun. 21, 2024, 29pgs.
Exhibit F-2—U.S. Pat. No. 10,495,823 Invalidity Claim Chart, Jun. 21, 2024, 26pgs.
Exhibit G—Other Validity Grounds (Non-Prior Art), Jun. 21, 2024, 54pgs.
Molex Incorporated, HBMT Motherboard Adapter, Doc. No. SD-106105-100MX, Oct. 31, 2005, 2pgs.
EX1027—Meriam Webster's Collegiate Dictionary, 11$^{th}$ ed., Cover and Bibliographic pages, p. 551 "groove," 2003, 4pgs.
EX1028—The Deposition of Witness, William Singhose, Ph.D, The United States International Trade Commission, Investigation No. 337-TA, Sep. 9, 2024, 82pgs.
EX1028—QSFP-DD, "Thermal Whitepaper: Enabling QSFP-001600 Ecosystem With Performance-Driven Thermal Innovations," accessed on the internet at www.qsfp-dd.com/wp-content/uploads/, retrieved Aug. 6, 2024, 12pgs.
EX1029—Representative Domestic Industry Claim Chart for U.S. Pat. No. 11,385,415 by MMC Adapters, Aug. 19, 2024, 5pgs.
EX2002—Molex Adaptor, Jul. 24, 2024, 1pg.
EX2003—Encyclopedia.com, Definition of Frame, accessed on the internet at https://www.encyclopedia.com/science-and-technology/computers-and-electrical-engineering/computers-and-computing/frame, retrieved Jul. 23, 2024, 12pgs.
Exhibit 1002—Declaration of Edward Lurie, *Senko Advanced Components, Inc.*, Petitioner v. *US Conec Ltd.*, Patent Owner, Before the Patent Trial and Appeal Board, Case PGR2024-00046, U.S. Pat. No. 11,808,994, dated Jul. 10, 2024, 362pgs.
Exhibit 1016—MOLEX—SFP-DD Hardware Specification for SFP Double Density 2x Pluggable Transceiver, Rev 1.0, Sep. 14, 2017, 50pgs.
Exhibit 1028—Tutorials of Fiber Optic Products, "Fiber Optic Connector Polishing," accessed on the internet at https://www.fiber-optic-tutorial.com/category/network-solutions/fiber-optic-polishing, retrieved Jun. 4, 2024, 6pgs.
Exhibit 1029—Fiber Cabling Solution, "UPC or APC—Which One to Choose?," accessed on the internet at https://www.fiber-optic-cable-sale.com/upc-or-apc-which-one-to-choose.html, retrieved Jun. 4, 2024, 3pgs.
Exhibit 1030—BELDEN, "APC vs. UPC: What's the Difference?," accessed on the internet at https://www.belden.com/blogs/upc-or-apc#:~:text=The main difference between APC,curvature for better core alignment 1, retrieved Jun. 4, 2024, 3pgs.
Exhibit 1035—QSFP-DD, "QSFP-DD MSA Group Announces New Hardware Specification," accessed on the internet at www.qsfp-dd.com/qsfp-dd-msa-group-announces-new-hardware-specification/, retrieved Jul. 10, 2024, 2pgs.
Exhibit 1036—QSFP-DD, "QSFP-DD MSA Group Announces New Hardware Specification," Internet Archive WayBack Machine, accessed on the internet at www.qsfp-dd.com/qsfp-dd-msa-group-announces-new-hardware-specification/, retrieved Oct. 29, 2017, 2pgs.
Exhibit 1037—SFP-DD, SFP-DD MSA Releases Specification for High-Speed, High-Density Interface, accessed on the internet at sfp-dd.com/2017/09/sfp-dd-msa-releases-specification-for-high-speed-high-density-interface/, retrieved Jul. 10, 2024, 4pgs.
Exhibit 1038—SFP-DD, SFP-DD MSA Releases Specification for High-Speed, High-Density Interface, Internet Archive WayBack Machine, accessed on the internet at sfp-dd.com/2017/09/sfp-dd-msa-releases-specification-for-high-speed-high-density-interface/, retrieved Oct. 15, 2017, 3pgs.
Patent Owner's Preliminary Response Under 37 C.F.R. § 42.107(a), *Senko Advanced Components, Inc.*, Petitioner v. *US Conec Ltd.*, Patent Owner, Before the Patent Trial and Appeal Board, Case IPR2024-00805, U.S. Pat. No. 11,385,415, dated Jul. 24, 2024, 44pgs.
Petition for Post-Grant Review of U.S. Pat. No. 11,808,994, *Senko Advanced Components, Inc.*, Petitioner v. *US Conec Ltd.*, Patent

(56) References Cited

OTHER PUBLICATIONS

Owner, Before the Patent Trial and Appeal Board, Case PGR2024-00046, U.S. Pat. No. 11,808,994, dated Jul. 23, 2024, 266pgs.

Paper 6, Decision Granting Institution of Inter Partes Review 35 U.S.C. § 314, *US Conec Ltd.*, Petitioner v. *Senko Advanced Components, Inc.*, Patent Owner, Before the Patent Trial and Appeal Board, Case IPR2024-00117, U.S. Pat. No. 11,333,836 B2, dated Jul. 9, 2024, 25pgs.

Paper 6, Decision Granting Institution of Inter Partes Review 35 U.S.C. § 314, *US Conec Ltd.*, Petitioner v. *Senko Advanced Components, Inc.*, Patent Owner, Before the Patent Trial and Appeal Board, Case IPR2024-00118, U.S. Pat. No. 11,340,413 B2, dated Jul. 9, 2024, 28pgs.

Paper 6, Decision Granting Institution of Inter Partes Review 35 U.S.C. § 314, *US Conec Ltd.*, Petitioner v. *Senko Advanced Components, Inc.*, Patent Owner, Before the Patent Trial and Appeal Board, Case IPR2024-00120, U.S. Pat. No. 10,191,230 C1, dated Jul. 9, 2024, 44pgs.

Paper 6, Decision Granting Institution of Inter Partes Review 35 U.S.C. § 314, *US Conec Ltd.*, Petitioner v. *Senko Advanced Components, Inc.*, Patent Owner, Before the Patent Trial and Appeal Board, Case IPR2024-00121, U.S. Pat. No. 11,181,701 B2, dated Jul. 9, 2024, 26pgs.

Paper 7, Decision Granting Institution of Inter Partes Review 35 U.S.C. § 314, *US Conec Ltd.*, Petitioner v. *Senko Advanced Components, Inc.*, Patent Owner, Before the Patent Trial and Appeal Board, Case IPR2024-00115, U.S. Pat. No. 11,307,369 B2, dated Jul. 9, 2024, 20pgs.

Paper 7, Decision Granting Institution of Inter Partes Review 35 U.S.C. § 314, *US Conec Ltd.*, Petitioner v. *Senko Advanced Components, Inc.*, Patent Owner, Before the Patent Trial and Appeal Board, Case IPR2024-00116, U.S. Pat. No. 11,307,369 B2, dated Jul. 9, 2024, 16pgs.

Petitioner's Reply to Preliminary Response to the Petition for Inter Partes Review, *US Conec Ltd.*, Petitioner v. *Senko Advanced Components, Inc.*, Patent Owner, Before the Patent Trial and Appeal Board, Case IPR2024-00805, U.S. Pat. No. 11,385,415, dated Aug. 19, 2024, 10pgs.

Petitioner's Request for Rehearing of the Institution Decision, *US Conec Ltd.*, Petitioner v. *Senko Advanced Components, Inc.*, Patent Owner, Before the Patent Trial and Appeal Board, Case IPR2024-00122, U.S. Pat. No. 11,061,190, dated Jul. 5, 2024, 19pgs.

Paper 9, Decision Granting Institution of Inter Partes Review 35 U.S.C. § 314, *US Conec Ltd.*, Petitioner v. *Senko Advanced Components, Inc.*, Patent Owner, Before the Patent Trial and Appeal Board, Case IPR2024-00119, U.S. Pat. No. 11,415,760 B2, dated Jul. 9, 2024, 41pgs.

\* cited by examiner

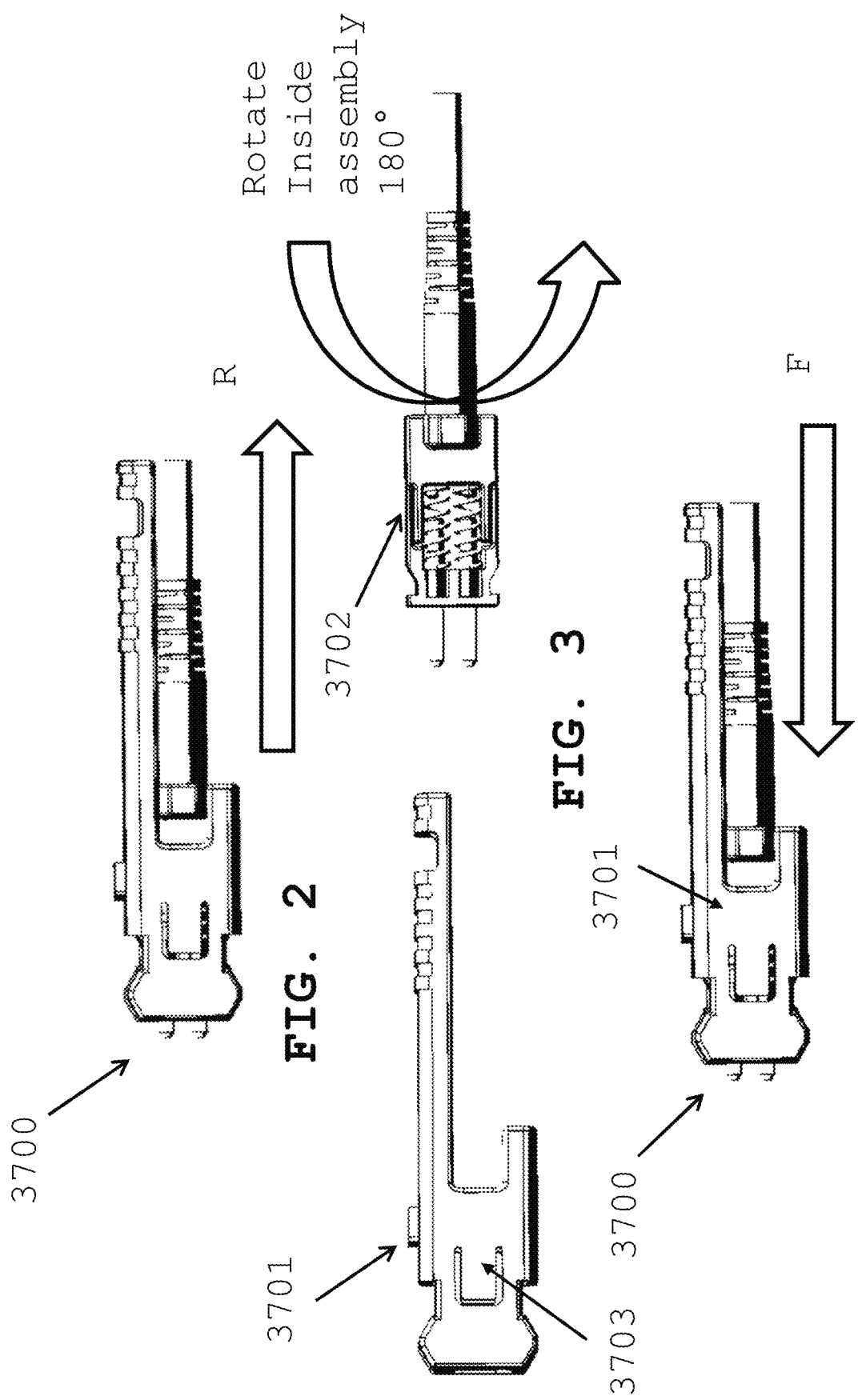

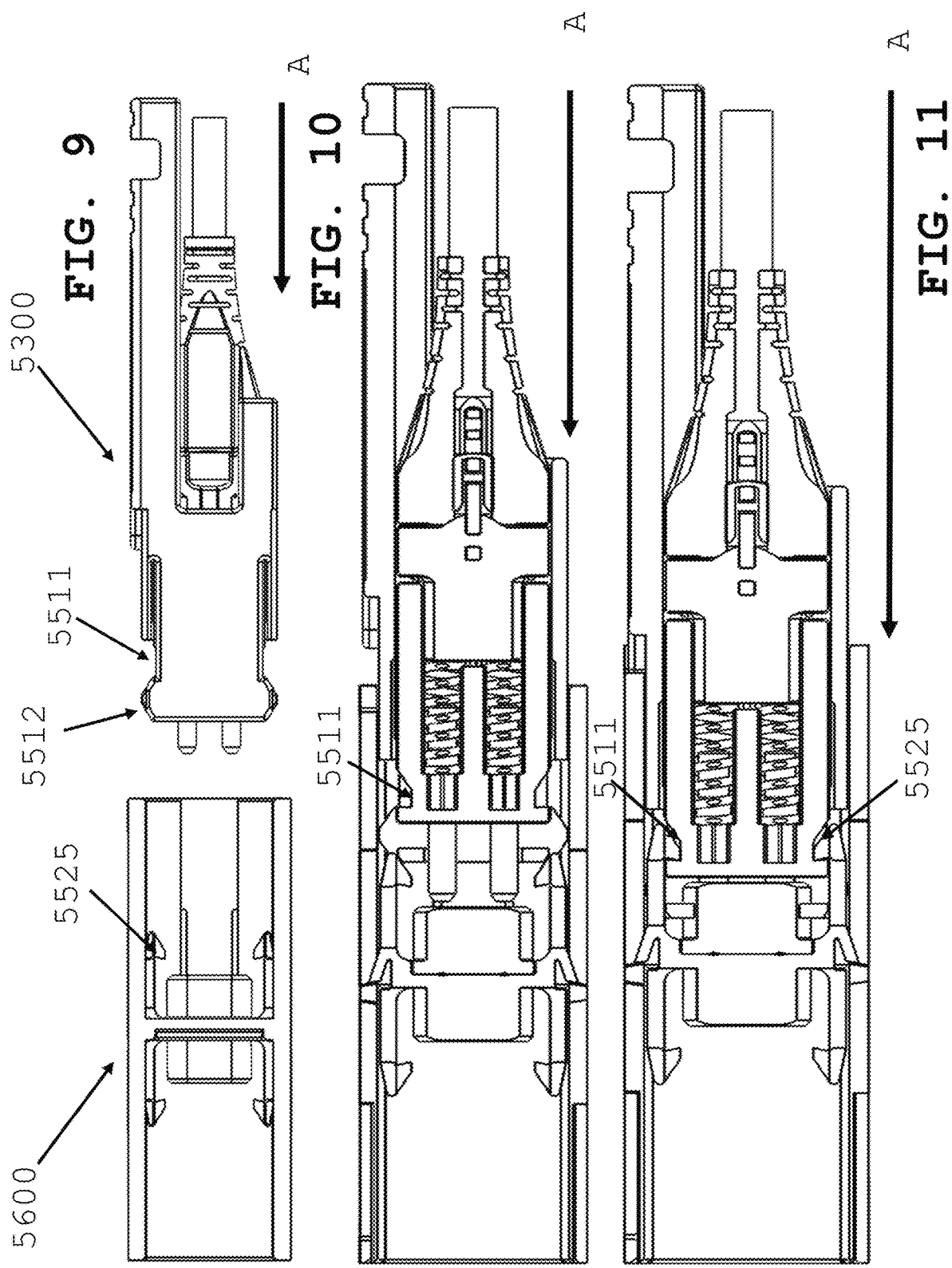

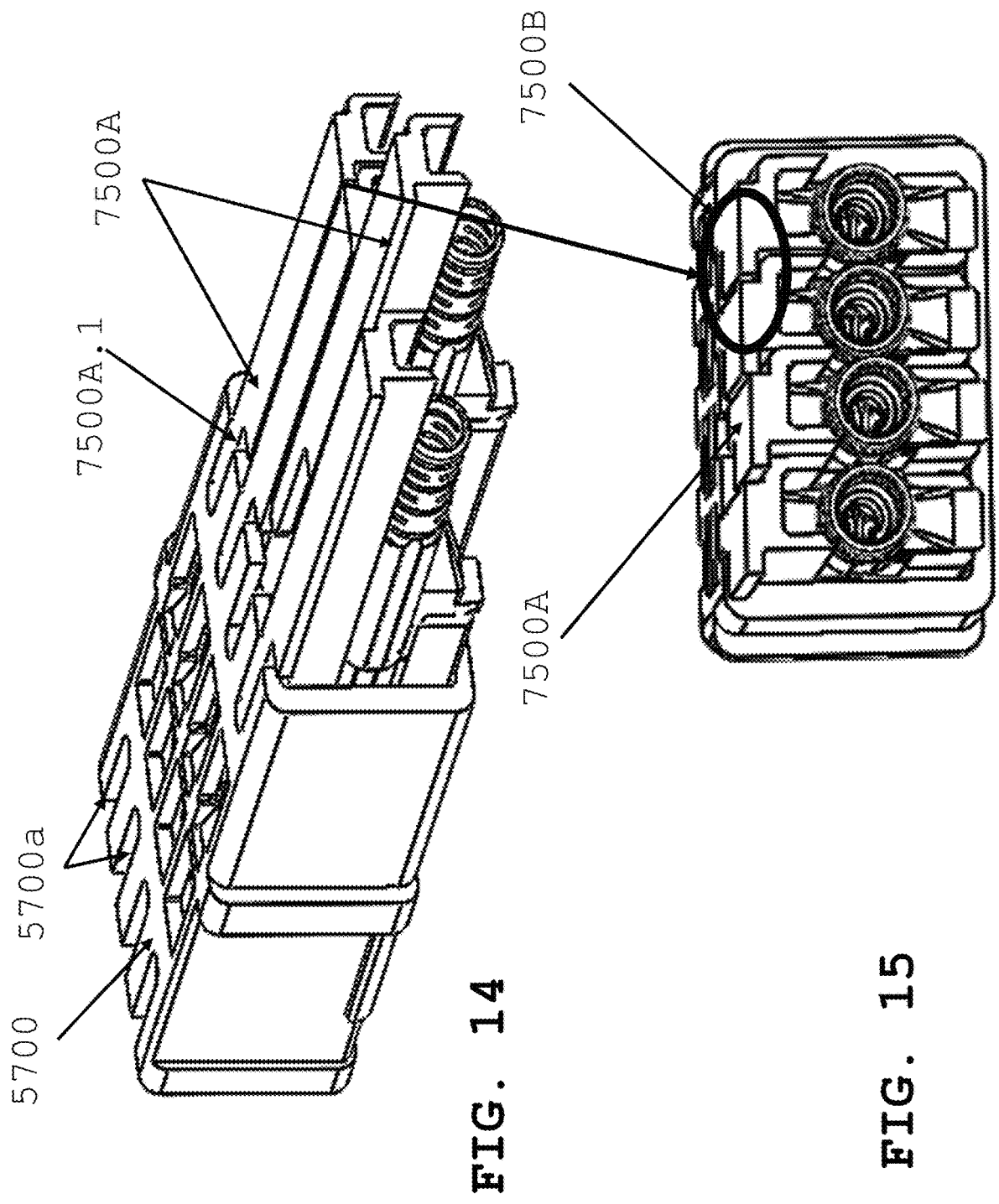

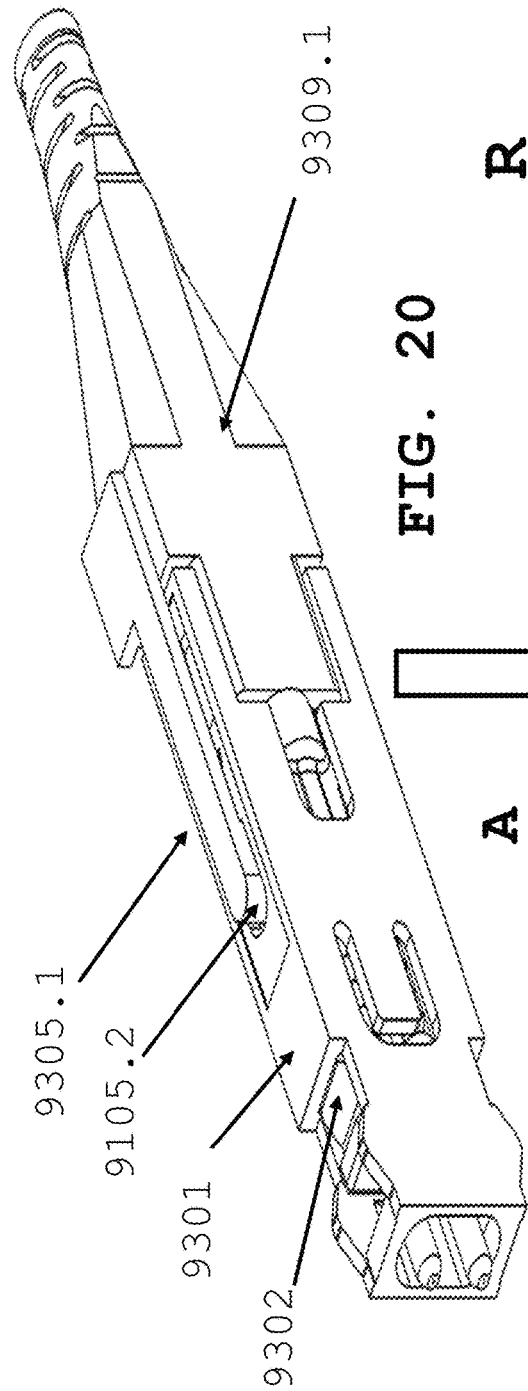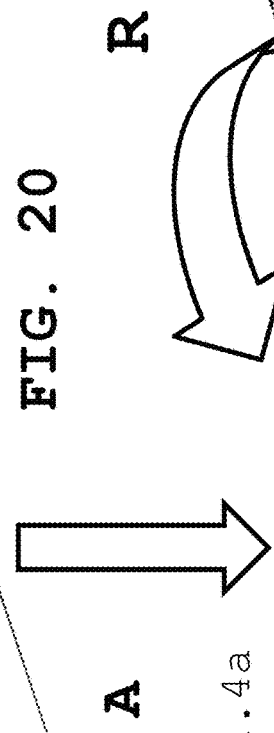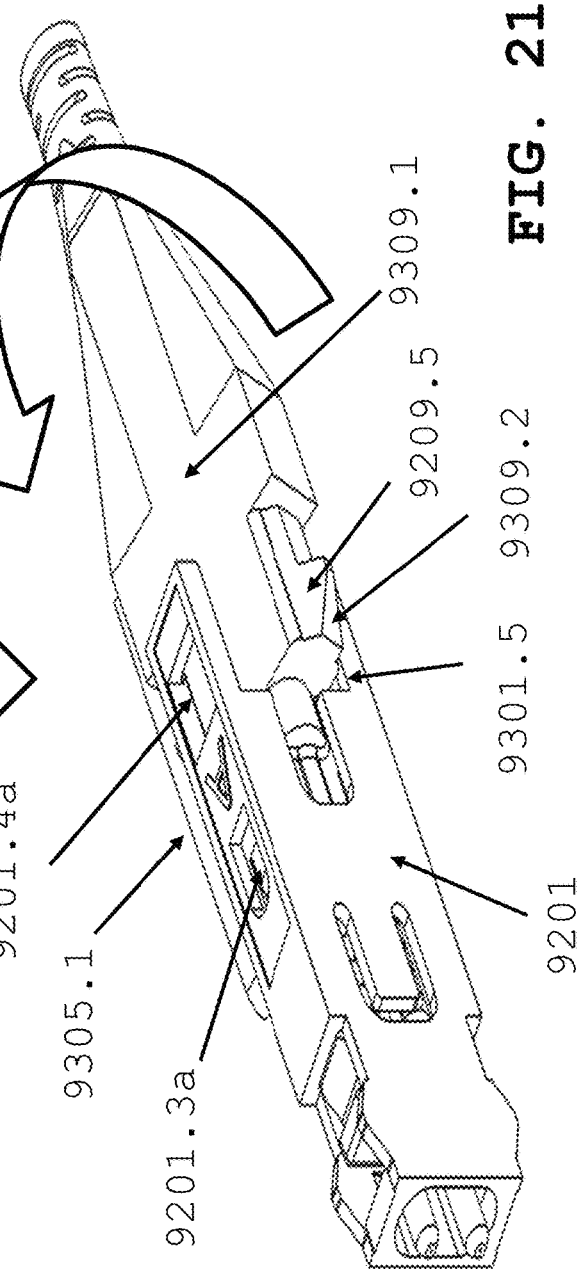

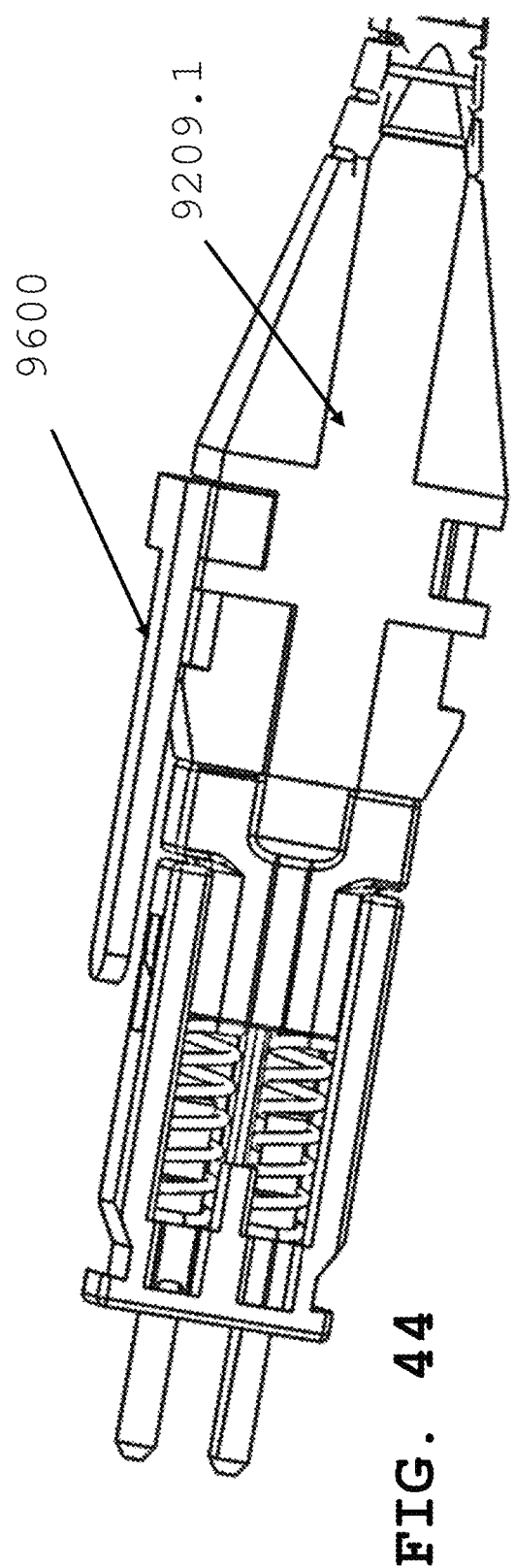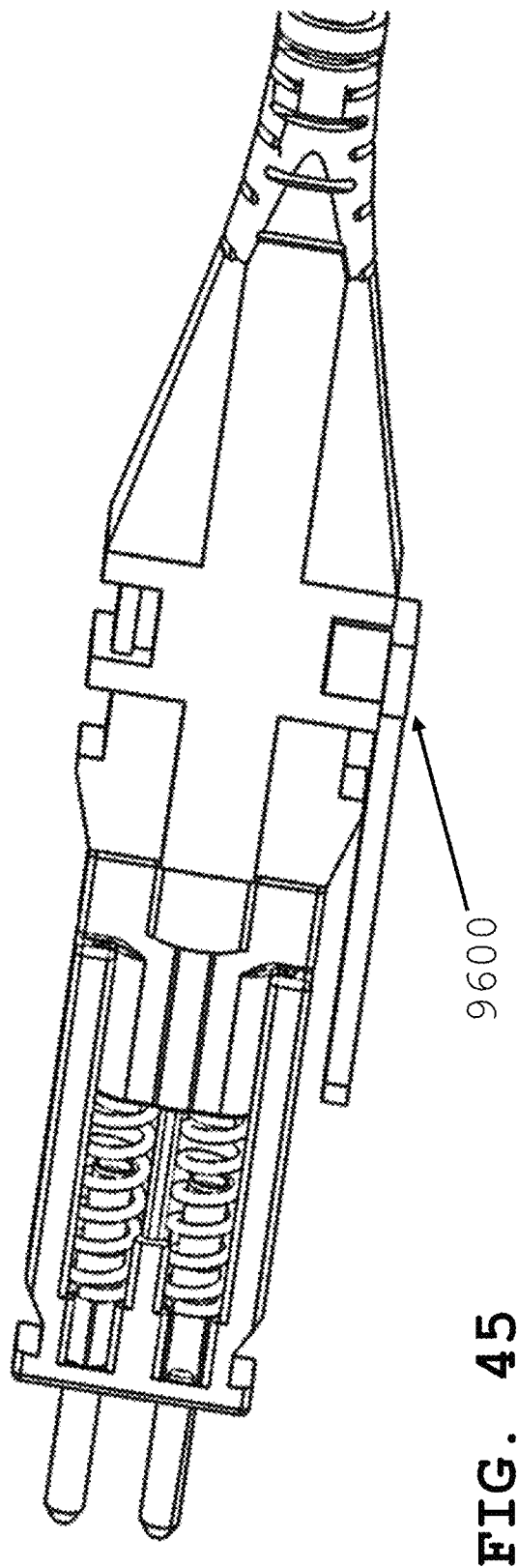

SMALL FORM FACTOR FIBER OPTIC CONNECTOR WITH MULTI-PURPOSE BOOT

RELATED APPLICATIONS

This application is a continuation of U.S. patent application Ser. No. 18/171,358, titled Small Form Factor Fiber Optic Connector with Multi-Purpose Boot filed on Feb. 19, 2023, which is a continuation of U.S. patent application Ser. No. 17/342,988, titled Small Form Factor Fiber Optic Connector with Multi-Purpose Boot filed on Jun. 9, 2021, which is a continuation of U.S. application Ser. No. 16/782,196 titled Small Form Factor Fiber Optic Connector with Multi-Purpose Boot Assembly, filed on Feb. 5, 2020, which is a divisional of U.S. patent application Ser. No. 16/368,828, titled Small Form Factor Fiber Optic Connector with Multi-Purpose Boot Assembly, filed on Mar. 28, 2019, which is a continuation of U.S. application Ser. No. 16/103,555, titled Ultra-Small Form Factor Optical Connectors Using a Push-Pull Boot Receptacle Release, filed on Aug. 14, 2018, which is a Continuation-in-Part of Ser. No. 16/035,691, titled Ultra-Small Form Factor Optical Connectors filed on Jul. 15, 2018, which claims priority to U.S. Provisional Application No. 62/649,539 titled Micro Connector with Multi-Purpose Boot, filed on Mar. 28, 2018; which claims priority to U.S. Provisional Application Ser. No. 62/588,276 filed Nov. 17, 2017; U.S. Provisional Application Ser. No. 62/549,655 filed Aug. 24, 2017; and U.S. Provisional Application Ser. No. 62/532,710 filed Jul. 14, 2017, all of the above applications are incorporated by reference in this non-provisional patent application.

FIELD OF THE INVENTION

The present disclosure relates generally to ultra-small form factor optical connectors, termed "micro optical connectors," and related connections within adapters and optical transceivers.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, room for improvement in the area of data centers, specifically as it relates to fiber optic connects, still exists. For example, manufacturers of connectors and adapters are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment. For example, one current footprint is known as the small form-factor pluggable transceiver footprint (SFP). This footprint currently accommodates two LC-type ferrule optical connections. However, it may be desirable to accommodate four optical connections (two duplex connections of transmit/receive) within the same footprint. Another current footprint is the quad small form-factor pluggable (QSFP) transceiver footprint. This footprint currently accommodates four LC-type ferrule optical connections. However, it may be desirable to accommodate eight optical connections of LC-type ferrules (four duplex connections of transmit/receive) within the same footprint.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

While an operator may attempt to use a tool, such as a screwdriver, to reach into a dense group of connectors and activate a release mechanism, adjacent cables and connectors may obstruct the operator's line of sight, making it difficult to guide the tool to the release mechanism without pushing aside the adjacent cables. Moreover, even when the operator has a clear line of sight, guiding the tool to the release mechanism may be a time-consuming process. Thus, using a tool may not be effective at reducing support time and increasing the quality of service.

BRIEF DESCRIPTION OF THE DRAWINGS

FIGS. 2-4 depict a technique polarity changing of the micro connector of FIG. 1

FIG. 9-11 depict inserting the micro-connector of FIG. 1 into an adapter.

FIG. 14 is a perspective view of micro connectors of FIG. 1 inserted into an adapter.

FIG. 15 is a perspective rear view of a group of micro connectors of FIG. 14.

FIG. 20 is a perspective view of the micro connector in a first polarity position.

FIG. 21 is a perspective view of the connector of FIG. 20 being rotated in direction "R" to a second polarity.

FIG. 34 is a perspective view along a longitudinal cross section of a micro connector of FIG. 16, latched into an adapter receptacle with multi-purpose rotatable boot assembly biased forward or pushed in.

FIG. 44 is an assembly view of the micro connector of FIG. 43 in a first polarity.

FIG. 45 is an assembled view of the micro connector of FIG. 43 in a second polarity.

DETAILED DESCRIPTION

The following terms shall have, for the purposes of this application, the respective meanings set forth below.

A connector, as used herein, refers to a device and/or components thereof that connects a first module or cable to a second module or cable. The connector maybe configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector maybe generally defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments described herein generally provide a remote release mechanism such that a user can remove cable assembly connectors that are closely spaced together on a high density panel without damaging surrounding connectors, accidentally disconnecting surrounding connectors, disrupting transmissions through surrounding connectors, and/or the like. Various embodiments also provide narrow pitch LC duplex connectors and narrow width multi-fiber connectors, for use, for example, with future narrow pitch LC SFPs and future narrow width SFPs. The remote release mechanisms allow use of the narrow pitch LC duplex connectors and narrow width multi-fiber connectors in dense arrays of narrow pitch LC SFPs and narrow width multi-fiber SFPs.

Figure 1:
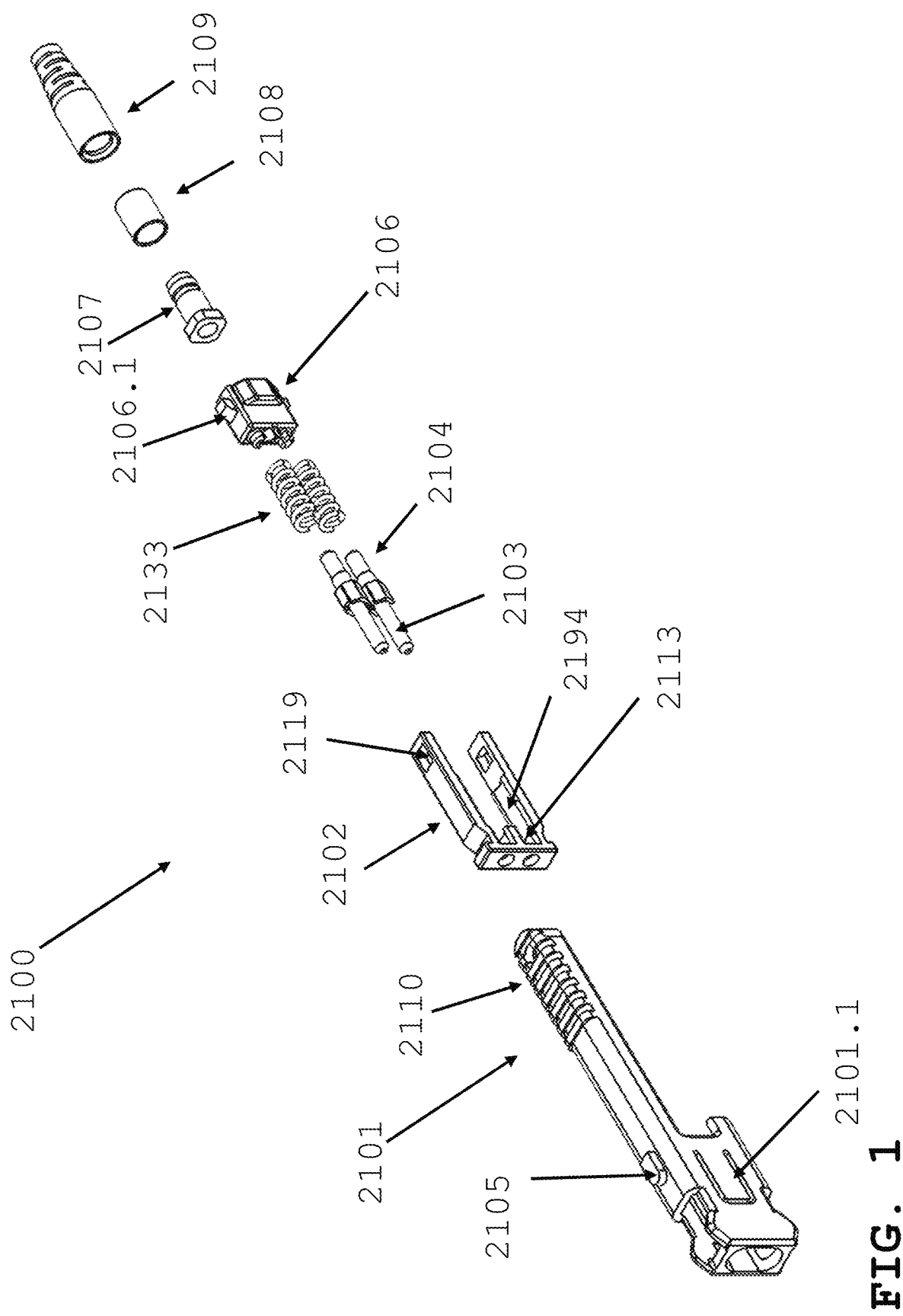
FIG. 1 is an exploded view of a micro optical connector improved according to disclosed embodiments of push/pull and polarity change in present invention.

FIG. 1 depicts an embodiment of micro optical connector 2100, shown in exploded view. Micro optical connector 2100 may include outer housing 2101, front body 2102, one or more ferrules 2103, one or more ferrule flanges 2104, one or more springs 2133, back body 2106, the latter has a wing 2106.1 on the top and bottom of the body, the wing 2106.1 is secured within an opening 2119 at a distal end of front body 2102, back post 2107, crimp ring 2108, and boot 2109. Front body 2102 side walls are open not closed, a channel 2194 for aligning ferrule flanges 2104, and an alignment sleeve opening 2113 to accept ferrule 2103. Outer housing 2101 may include a longitudinal bore for accommodating front body 2102 and ferrule 2103, springs 2133 and back body 2106, connector alignment key 2105 used during interconnection, connector flap 2101.1 and an optional pull key 2110 to facilitate removal of connector 2100 when connected in a dense array of optical connectors. Optionally, the ferrules may be LC-type ferrules having an outer diameter of 1.25 mm. Connector flap 2101.1 secures front body 2102 within outer housing 2101. Alignment key 2105 is also used as blocking structure to indicated connector polarity orientation as disclosed herein. Polarity is determined by the ferrules 9203 (Refer to FIG. 19), where a first ferrule is for Tx or transmit and a second ferrule is for Rx or receive. As known in the art, a mismatch of ferrules 9203 with opposing ferrules secured in an opposing adapter port, the signal would be lost. Alignment key performs a dual function, when the boot assembly is rotated, the alignment key is repositioned, so upon insertion into an adapter, the connector can be blocked by the key. This in effect disallows the user to insert the connector within the adapter receptacle, thus, preventing a mismatch of signal between opposing connectors across an adapter interface. As disclosed below, starting at FIG. 18 an additional aid may be markings located on the connector housing, indicating "A" or "B" polarity of the connector ferrules after rotating the boot.

As depicted FIGS. 2-4, FIG. 2 micro connector 3700 includes an assembled front body 3702 that may be removed from outer housing 3701, rotated 180° as indicated by the arrow (FIG. 3), and re-inserted into the outer housing (FIG. 4). This allows for a change in the polarity of the connector by removing and rotating front body 3702, and therefore the ferrules can be switched quickly and easily without unnecessarily risking the delicate fiber cables and ferrules. Referring to FIG. 2, micro connector 3700 is fully assembled. To remove front body 3702 to change connector polarity, as shown in FIG. 3, one or more flex key 3703 are lifted outward to release front body 3702 for removal in rearward in the direction of the arrow "R". Referring to FIG. 4, to complete the polarity change, after rotating front body 3702 by 180 degrees as shown in FIG. 3, front body 3702 is inserted into the outer housing in the direction of arrow "F".

Figure 5:
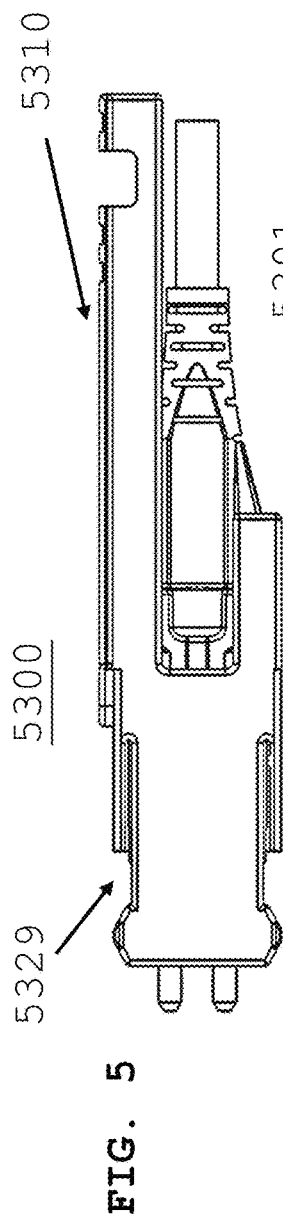
FIGS. 5-8 depict polarity changing according to another embodiment of the present invention of a micro-connector.
Figure 6:
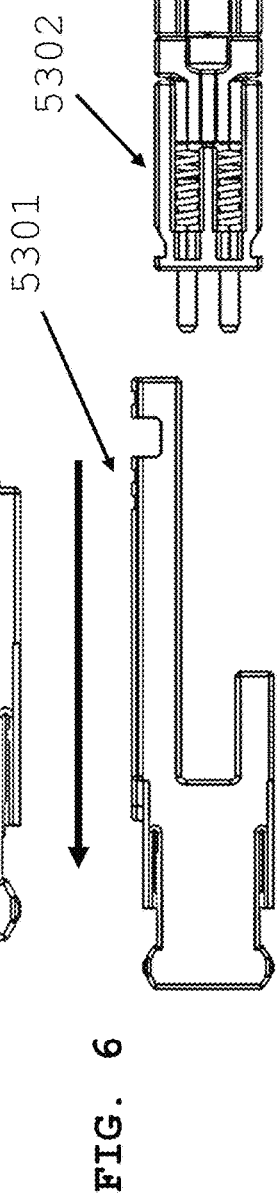
Figure 7:
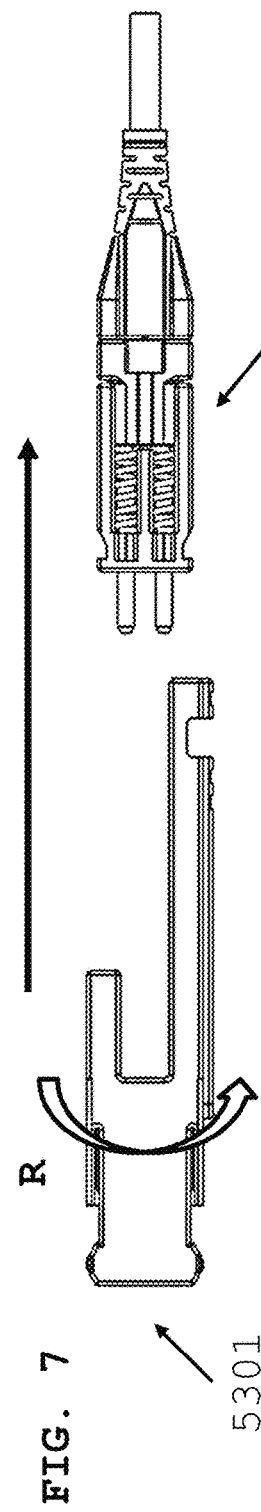
Figure 8:
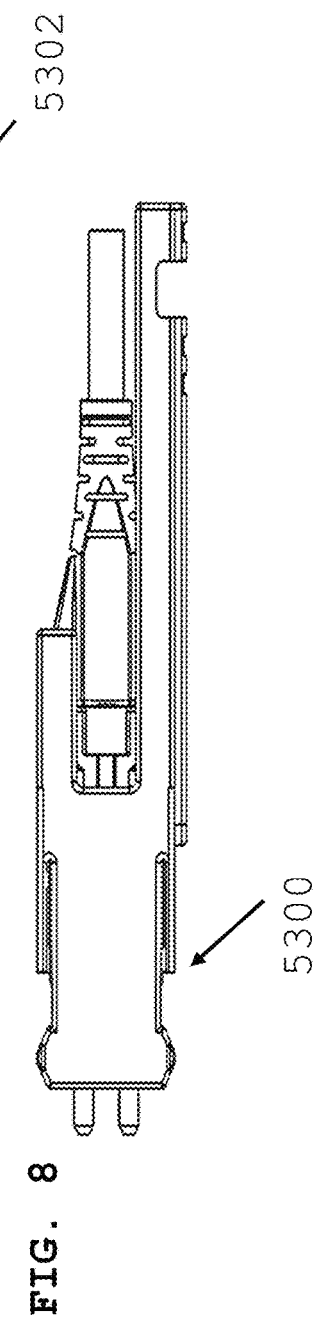

FIG. 5 depicts the operation of the polarity change mechanism using outer housing 5301 (refer to FIG. 6), where pull key 5310 is integrated with the outer housing. In FIG. 5, micro connector 5300 is fully assembled. The user inserts a tool in access slot 5329 and lifts off outer housing 5301, instead of flexible keys 3703 (refer to FIG. 3). Front body 5302 is removed with the boot and cable attached as shown in FIG. 6. Turning to FIG. 7, the outer housing 5301 is rotated 180 degrees, as shown by the arrow "R", and placed back over front body 5302 in the direction of the second arrow as shown. The reversed polarity micro connector 5300 is shown fully assembled in FIG. 8.

Referring to FIG. 9, micro connector 5300 is shown just prior to insertion into adapter 5600. Connector 5300 is partially inserted in FIG. 10, wherein connector hook (or adapter hook) 5525 has not yet been seated in the connector recess 5511, and FIG. 11 depicts hook 5525 seated in recess 5511, in direction of arrow "A".

Figure 12:
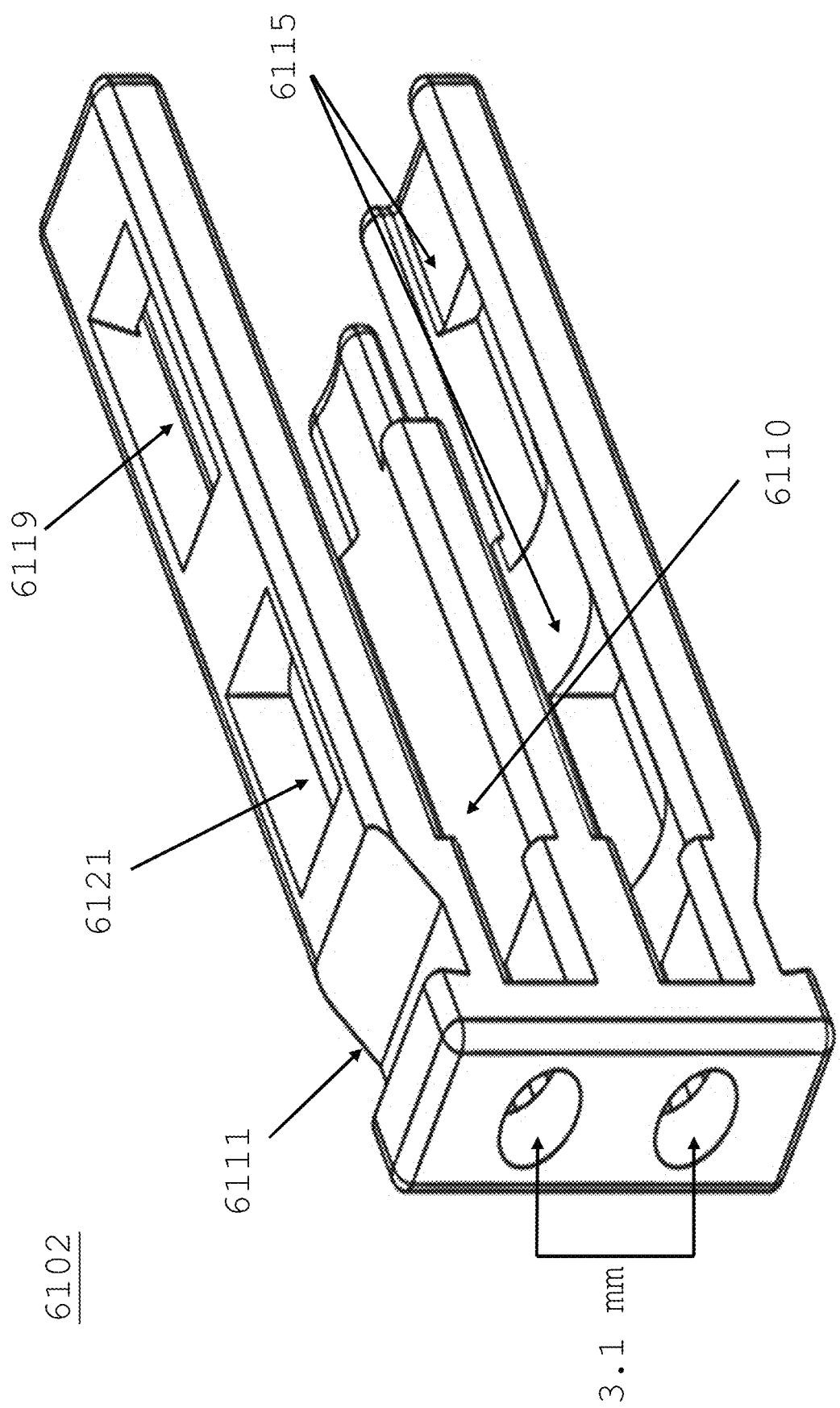
FIG. 12 is a perspective view of a front body according to an embodiment of the present invention.
Figure 13:
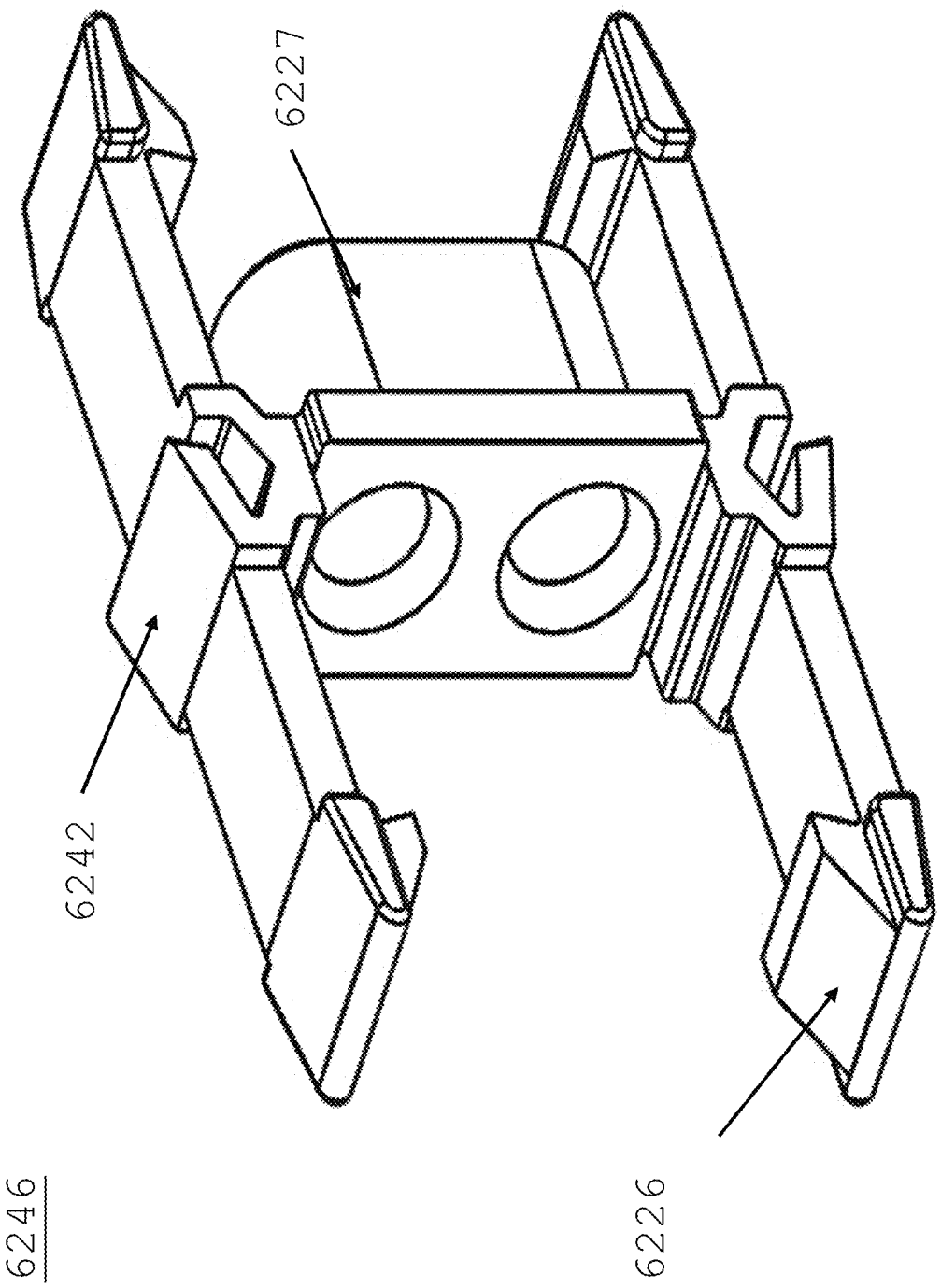
FIG. 13 is a perspective view of another embodiment of an adapter hook and alignment assembly.

Referring to FIG. 12, front body 6102 has two cutouts 6119 and 6121 and an extended middle wall 6110. Cutout 6121 engages the outer housing hooks (not shown) that replaces flex key 3703 to secure the outer housing to the front body. Cutout 6121 secures the polarity change key 5310. Cutout 6119 secures back post 2106 to front body 6102 via back post front body hook 2106.1 (refer to FIG. 2). The material is saved at back post 2106 overmolding, by not using the flex key, and this saved material to reinforce the middle wall to better help support the ferrule springs from bending and thus help prevent distorting the ferrules. This reduced material also allowed a reduction in the connector size contribution to a 3.1 mm ferrule to ferrule pitch as shown in FIG. 12. This distortion can increase insertion loss. Connector recess 6111 is located at the proximal end of front body 6102, and the recess engages and locks with connector hook 5525. Referring to FIG. 13, adapter hook 6246 added chamfers (6242, 6226) to adapter (connector) hook surfaces to improve installation of the connector into the adapter when connector ramps 5512 engage adapter (connector hook) 5525 Refer to FIG. 5). Adapter hook assembly has an alignment sleeve holder 6227 that accepts one or more ferrules from the micro connector, and aligns the ferrules 9203 with opposing ferrules of a second micro connector (not shown).

FIG. 14 illustrates a group of micro connectors 7500A inserted into an adapter 5700. Adapter 5700 has plural of slots 5700a configured to accept an alignment key 7500A.1 proximal on the alignment and offset key (7500A, 9105.1) Alignment key, and alignment and offset key is defined as a protrusion adjacent to a side of the connector housing.

FIG. 15 depicts alignment and offset key 7500B with the group of micro connectors 7500A of FIG. 14. Alignment/offset key 7500B adds stability and reduces misalignment during insertion when key 7500B acts as a support between connectors as shown. Key 7500B also helps determine polarity of the micro connector, as described herein.

Figure 16:
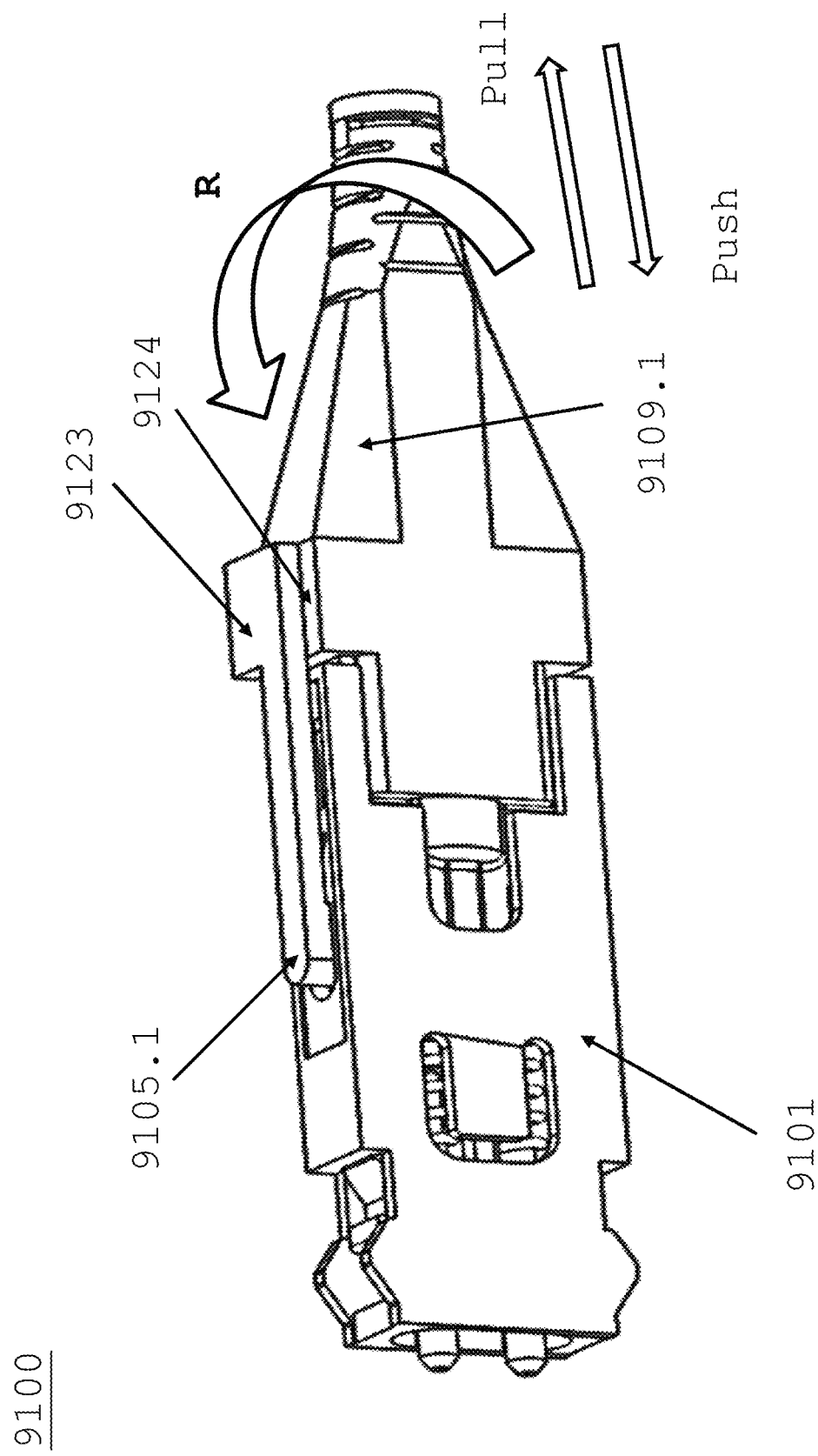
FIG. 16 is a perspective view of a micro connector with multi-purpose push/pull-rotatable boot (FIG. 17) for insert/removal of connector from adapter and for polarity change.
Figure 17:
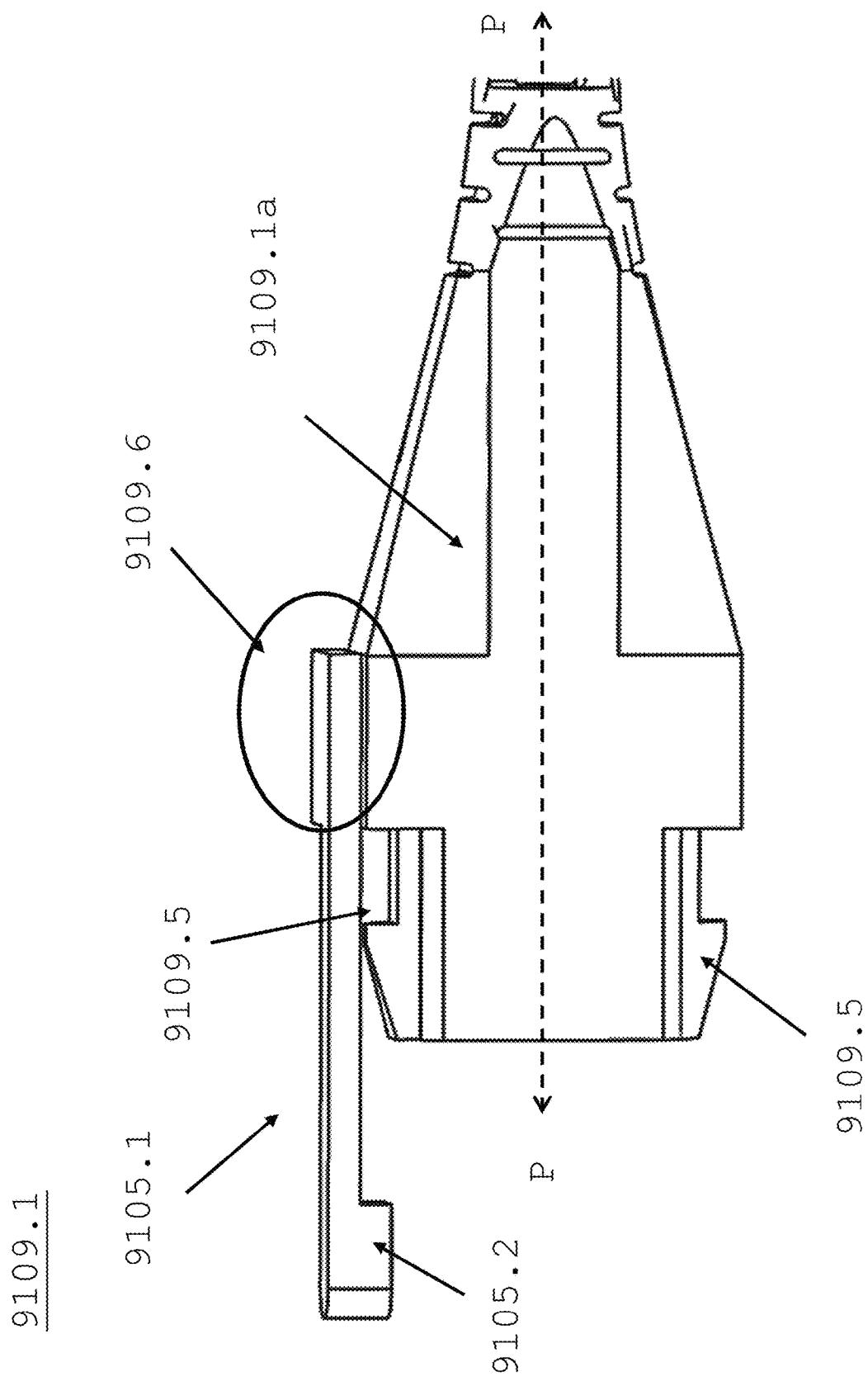
FIG. 17 is a perspective view of multi-purpose rotatable boot assembly with an alignment and offset key releasable attached to the boot assembly.
Figures 18, 19:
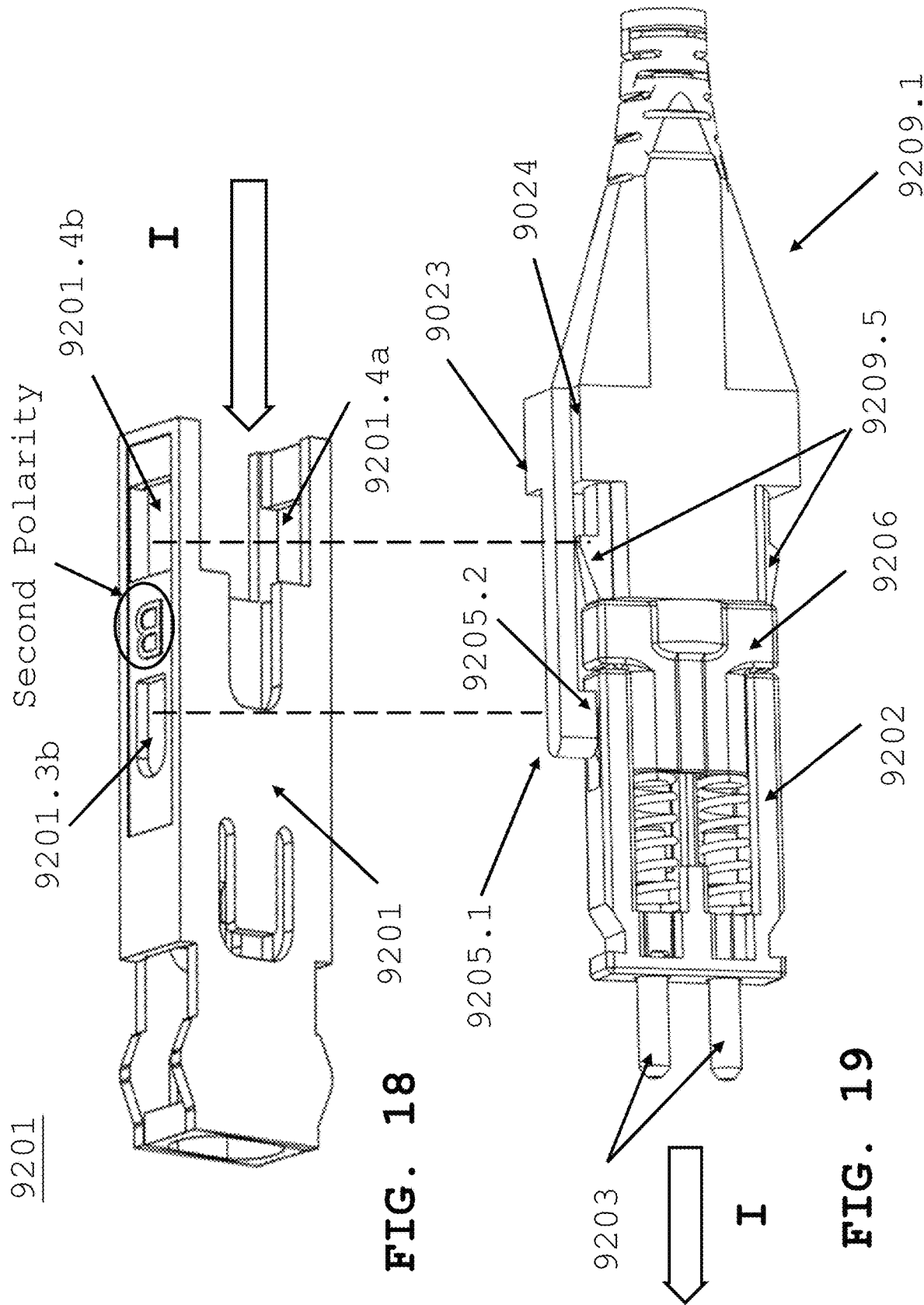
FIG. 18 is a perspective view of an outer housing of the micro connector of FIG. 16.
FIG. 19 is a perspective view of front body and boot removed from FIG. 18 outer housing.

Referring to FIGS. 16-17, FIG. 16 depicts micro connector 9100 with an alignment and offset key 9105.1 having an offset portion 9123. Offset portion 9123 engages a top surface of a side bar ledge 9124 for aligning connector 9100 into a multi-receptacle adapter next to another micro connector. Side bar ledge 9124 is located further back or nearer a distal end of a connector (e.g. closer to the cable) where side bar ledge 9124 is part of a multi-purpose rotatable boot 9109.1. Micro connector 9100 outer housing 9101 is secured to boot 9100.1 via boot hooks 9109.5 (FIG. 17) that engages second slot 9201.4a and 9201.4b in connector housing 9201 (as shown in FIG. 18), when in polarity status "B" or status "A", as depicted on outside of micro connector housing. Multi-purpose boot is rotatable in the direction of arrow "R".

Figure 43:
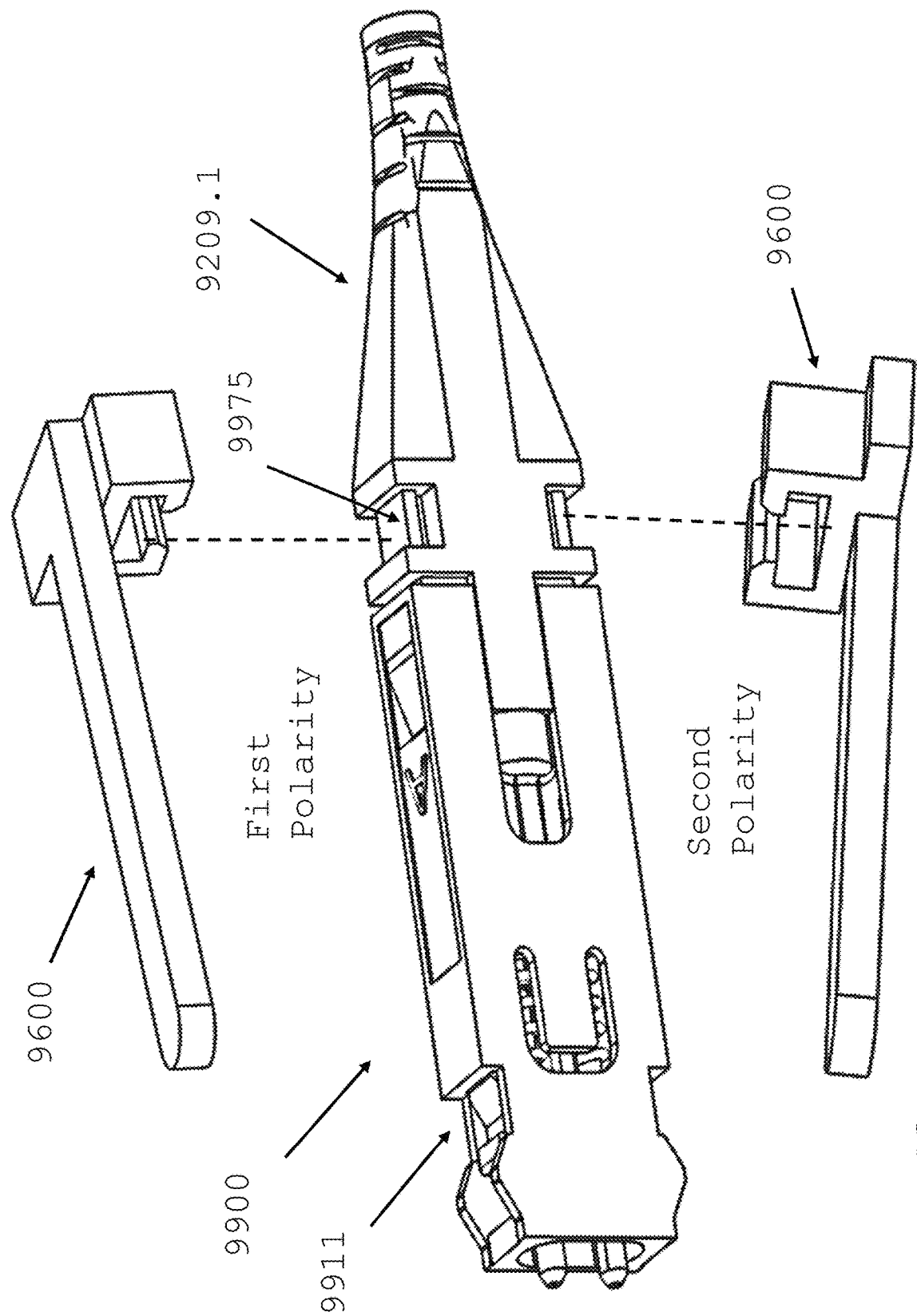
FIG. 43 is an exploded view of another embodiment of a micro connector with a releasably attached clip defining a first and a second polarity.

Referring to FIG. 17, multi-purpose rotatable boot 9109.1 comprises releasably attached alignment and offset key 9105.1, releasable at release point 9109.6, also refer to FIG. 43. Alignment and offset key 2105 may be fixed on connector outer housing, as shown in FIG. 1 or at alignment key 5305 disclosed in FIG. 37. The alignment key may have not offset portion as disclosed in FIG. 1 and FIG. 37, without departing from the scope of the invention, that the boot assembly is rotatable as disclosed in FIGS. 26-27 and FIGS. 25-33 and FIGS. 43-45. It is the key protruding from the connector housing that is determines polarity upon rotation of the boot assembly as disclosed herein. Alignment key (2105, 9405.1, 5305, 9600) or similar structure protruding from the outer connector housing repositioned by the rotating boot assembly and the key interaction with adapter structure that determines polarity as described herein. Referring to FIG. 17, key 9105.1 has a securing protrusion 9105.2 at a proximal end that engages first slot 9201.3b in connector housing 9201 (refer to FIG. 18) to further secure multi-purpose rotatable boot assembly 9109.1 to front body 9202 or outer housing 9201. Multi-purpose rotatable boot assembly 9109.1 comprises a body 9109.1a with a passageway along line P-P for passing a fiber optic cable (refer to FIG. 26 and FIG. 27) to the ferrules to complete the signal path.

Referring to FIG. 18, outer housing 9201 is shown in a Second Polarity orientation "B" comprising corresponding first slot 9201.3b and second slot 9201.4b. Multi-purpose rotatable boot assembly 9209.1 (FIG. 19) is inserted at a distal end of connector housing 9201 shown in the direction of arrow "I". Second slot 9201.4a corresponds to polarity position "A".

Referring to FIG. 19, multi-purpose rotatable boot assembly 9209.1 comprises alignment and offset key 9205.1, as described herein boot hook 9209.5, side bar ledge 9024 that is configured (as described herein) to engage back body 9206, front body 9202 and plural of ferrules 9203. Side bar ledge 9024 accepts offset key 9023 of a second connector when two connectors are inserted into an adapter. This allows connectors to be inserted side by side into an adapter more easily, without jamming. The proximal end (or ferrules 9203 end) of assembly 9209.1 is inserted into a distal end of the outer housing 9201 (FIG. 18) in the direction of arrow "I". Upon insertion, the outer housing 9201 engages with multi-purpose rotatable boot assembly 9209.1 as shown by the dotted lines between first slot 9201.3b and second slot

9201.4b, engaging securing protrusion 9205.2 on alignment and offset key 9205.1 and boot wing 9209.5. The wing and securing protrusion are received second slot and first slot described in FIG. 18 outer housing.

Referring to FIG. 20, front body 9302 and boot assembly 9309.1 are assembled in micro connector housing 9301 with alignment and offset key 9305.1 in a first polarity position.

Referring to FIG. 21, multi-purpose rotatable boot assembly 9309.1 is rotated in direction "R" to convert from a first polarity "A" (refer to FIG. 20) to Second Polarity "B" (refer to FIG. 23), with alignment and offset key 9305.1 180 degrees or opposite the first polarity position as depicted in FIG. 20, to Second Polarity position "B". Boot rotation key 9305.1 may be sized as disclosed in FIG. 1. Boot hook 9209.5 further comprises chamfer 9309.2. Chamfer 9309.2 engages wall 9301.5 of connector outer housing and chamfer 9309.2 lifts boot hook 9209.5 out of a distal end of connector housing 9301 and is freed from second slot 9201.4b, and securing protrusion 9105.2 (refer to FIG. 17 and shown in FIG. 20) lifts out of first slot 9201.3b thereby allowing the boot assembly to rotate as shown in the direction "R", FIG. 21. Chamfer 9309.2 may engage wall 9301.5 using an angle or chamfer cut opposite current chamfer 9309.2 to allow for rotation in the opposite direction of FIG. 21. Rotation of boot assembly 9309.1 changes connector 9100 from a first polarity "A", as depicted in FIG. 20, to Second Polarity "B", as depicted in FIG. 19 (without connector housing) and FIG. 32. Boot assembly may be rotated in a clockwise direction, without departing from the scope of the invention.

Figure 22:
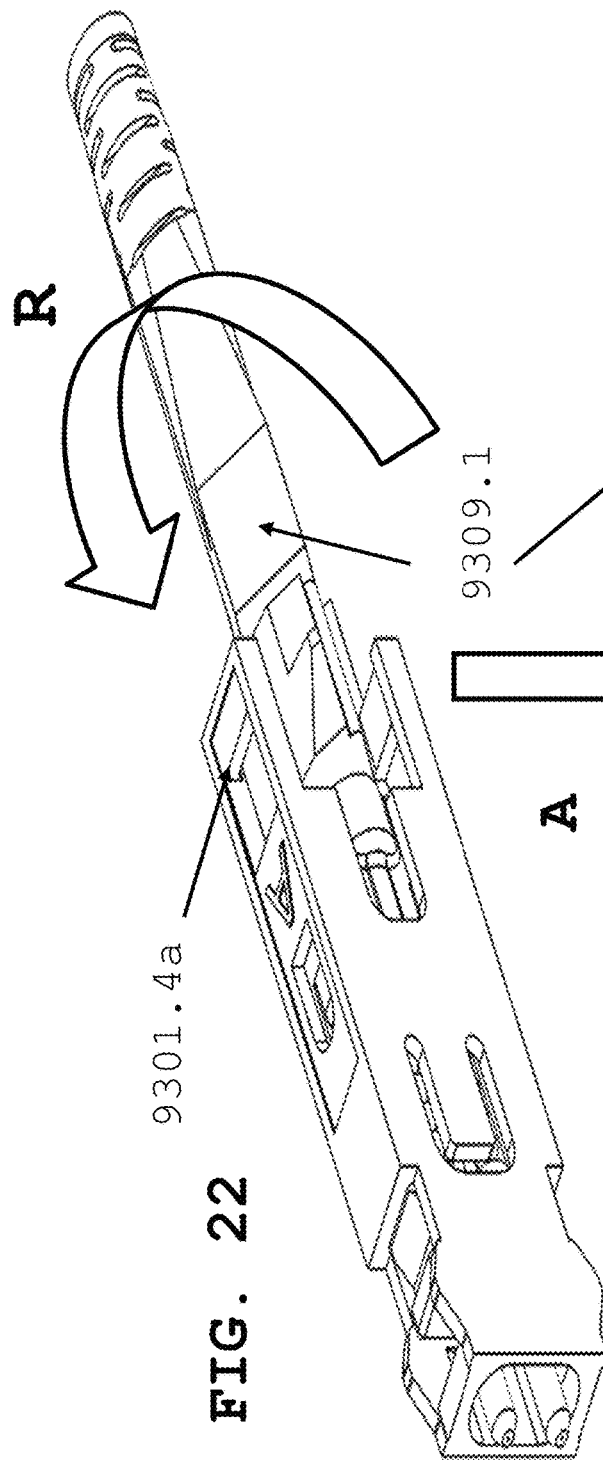
FIG. 22 depicts micro connector of FIG. 20 being rotated further to the second polarity.
Figure 23:
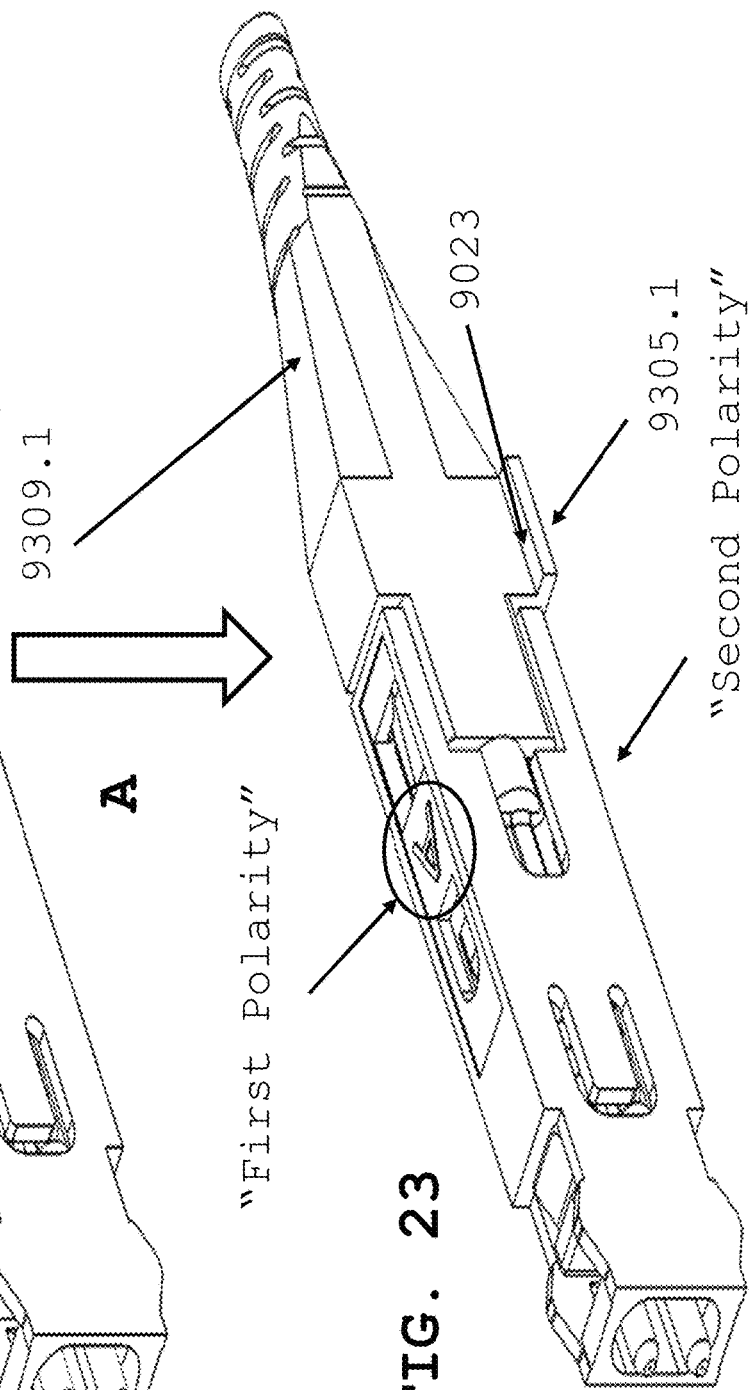
FIG. 23 depicts micro connector of FIG. 20 in the second polarity.

Referring to FIG. 22, further rotation of boot assembly 9309.1 results in a change to a second polarity as shown in FIG. 23, with alignment and offset key secured within polarity "B" first slot 9201.3b.

Referring to FIG. 23, side bar ledge 9023 (as well as alignment key 9305.1) is in Second Polarity position or "B" polarity, and when the micro connector is inserted into an adapter (not shown), the micro connector is oriented with key 9305.1 in an opposite position to FIG. 20, so key may be blocked by corresponding adapter structure (not shown). If micro connector 9100 is blocked by adapter structure this means the micro connector is not in the correct polarity orientation to make a fiber to fiber connection via an adapter to an opposing fiber optic connector or transceiver as is known in the art. After rotation, the ferrules are reversed the top ferrule is now the bottom ferrule, and this results in a second polarity configuration. The second polarity being different from the first polarity, that is, Rx receive signal is now Tx transmit signal path and vice versa. Alignment and offset key 9405.1 has been switch from a First Polarity "A" to Second Polarity "B".

Figure 24:
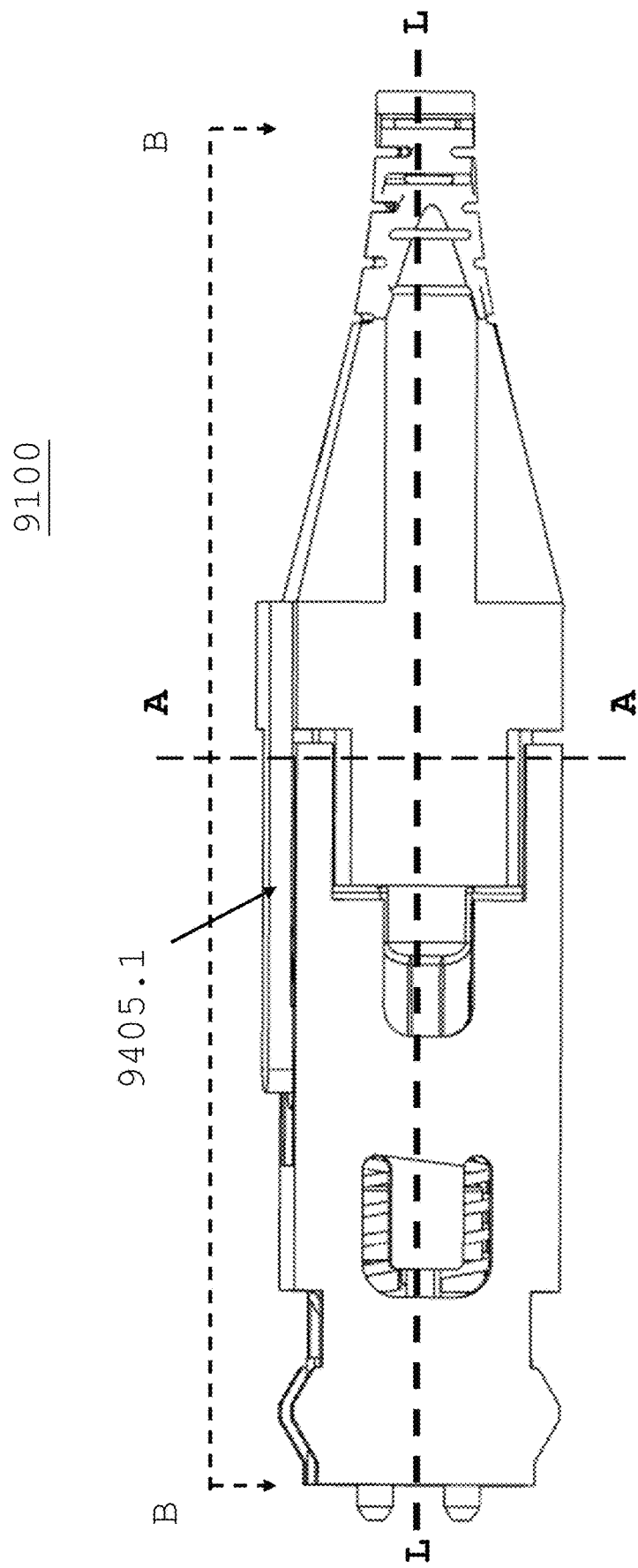
FIG. 24 is side view of micro connector of FIG. 16 with a cross section cut "A-A".

FIG. 24 is the micro connector 9100 with a cross section along "A-A" line as shown in FIGS. 25 through 33 further illustrating polarity change using multi-purpose rotatable boot assembly 9209.1. Longitudinal cross section is provided along line "B-B" in various drawings of this application. "L-L" is the longitudinal axis of the connectors in the present invention.

Figure 25:
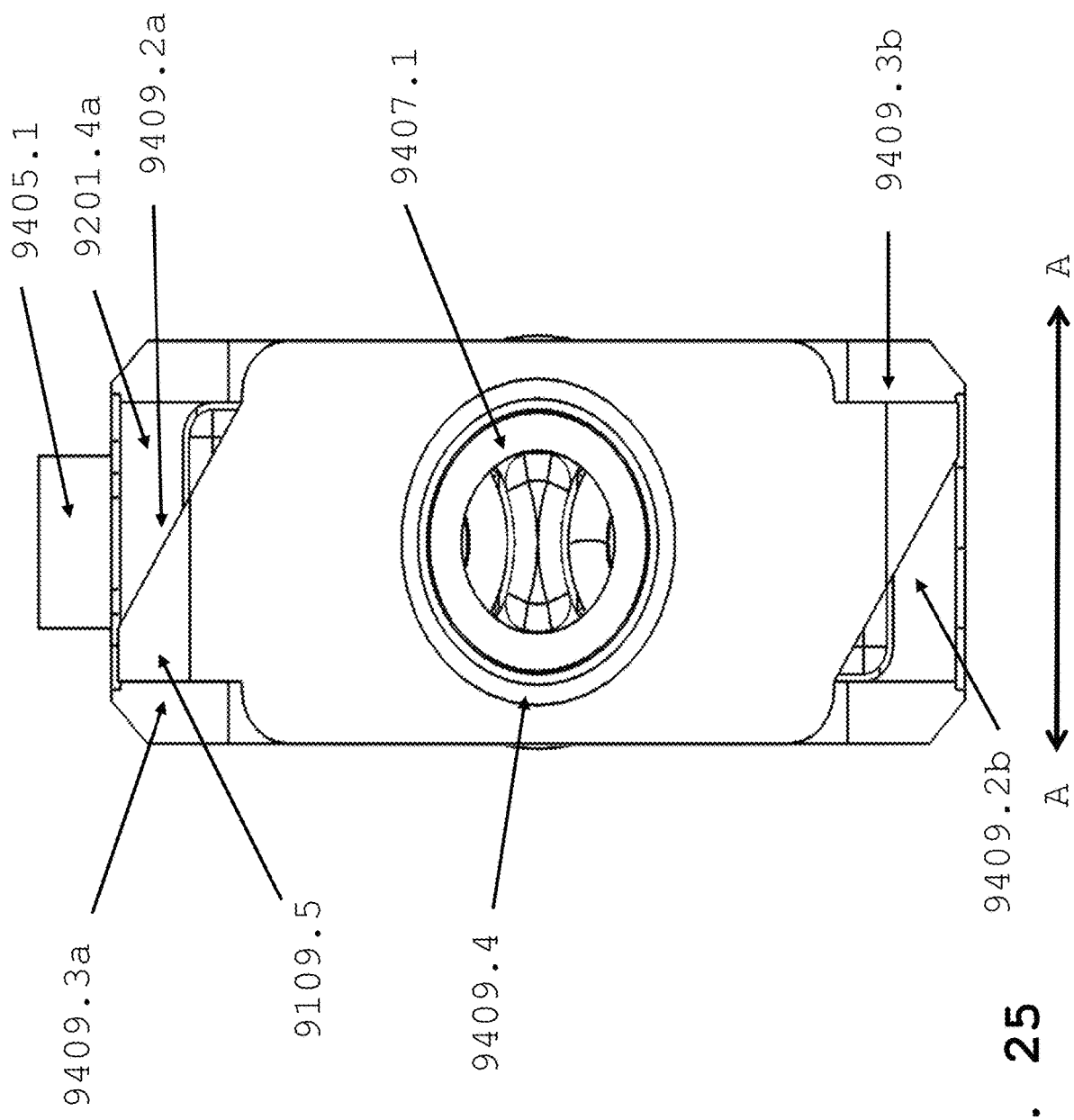
FIG. 25 is a view along cross section cut "A-A" of the micro connector of FIG. 16 in a first polarity position.
Figure 26:
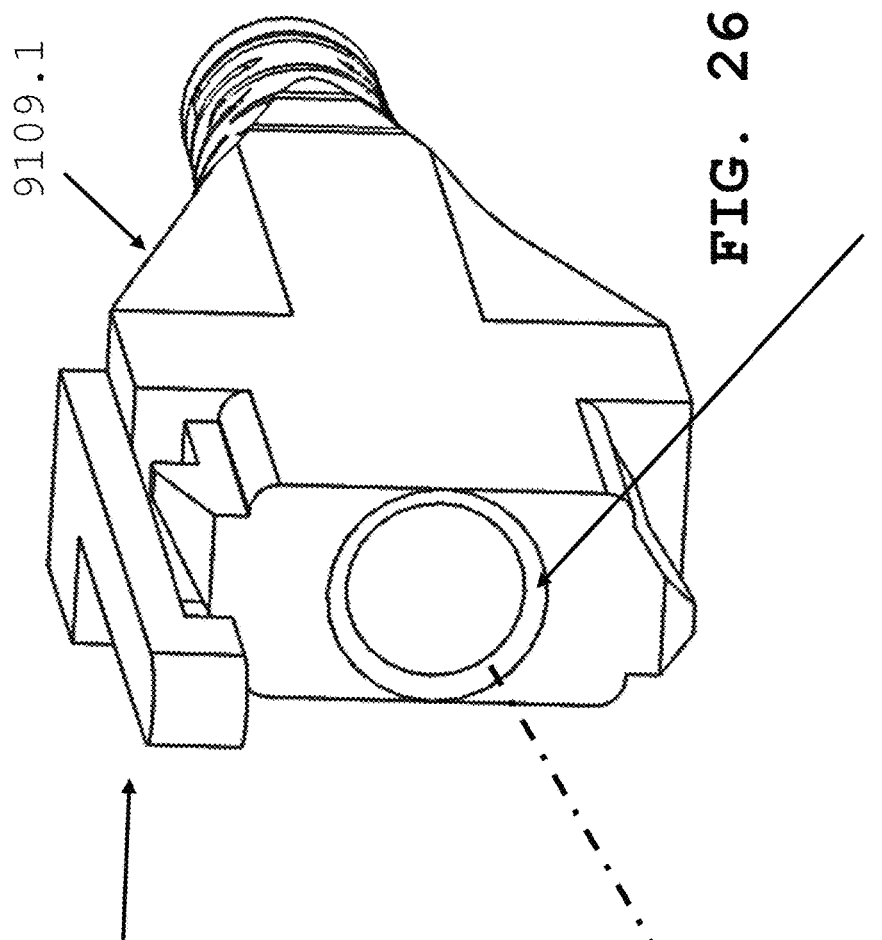
FIG. 26 is an end view of the boot assembly illustrating an opening for fiber optic cabling.
Figure 27:
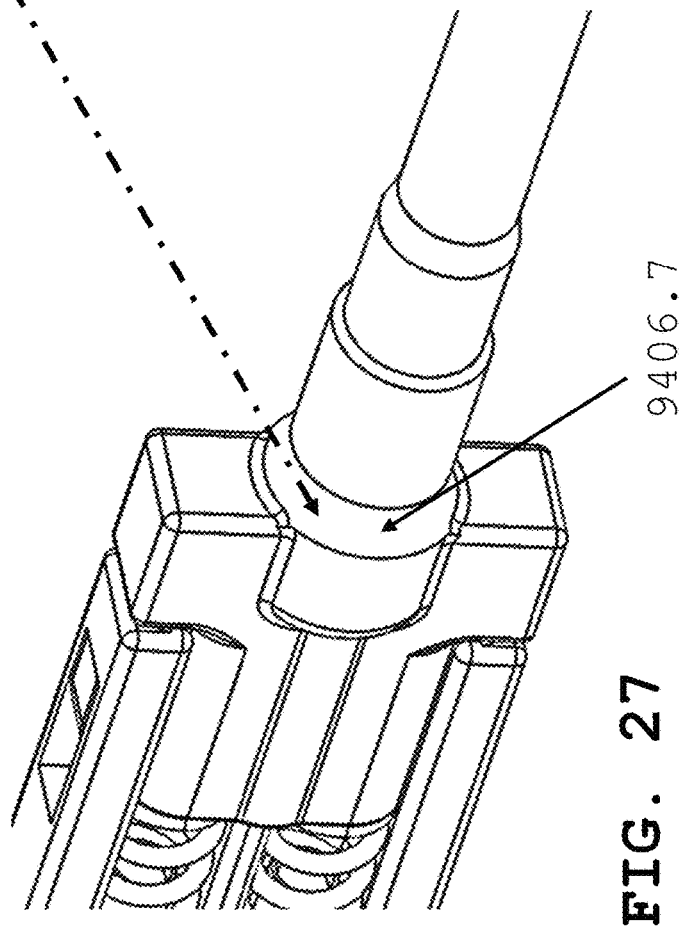
FIG. 27 is a perspective view of end of a back body, with fiber optic cabling.

Referring to FIG. 25, a front view of the cross-section cut "A-A" of the micro connector of FIG. 24 (also FIG. 16) further comprises an opening through which fiber cabling (not shown) travels, and crimp ring surface 9407.1 that is further surrounded by inner round 9409.4. Referring to FIG. 26, inner round 9409.4 engages a back post surface 9406.7 formed as an outer round shown at FIG. 27, as the assembly 9209.1 is rotated. Inner round and outer round form mating surfaces that can freely rotate thereby allowing multi-purpose boot assembly to be rotated about fiber optic connector housing. Referring back to FIG. 25, boot hook 9109.5 further comprises first chamfer 9409.2a and first stopping wall 9409.3a, and second chamfer 9409.2b and second stopping wall 9409.3b, in a first polarity position. Boot hooks 9109.5 rotate between second slot 9201.4a and second slot 9201.4b during polarity change. Second slot 9201.4a corresponds to the connector being in a "A" polarity position. Likewise, second slot 9201.4b corresponds to the connector being in "B" polarity configuration. Securing protrusion 9405.1 resides in first slot 9201.3a for "A" polarity, and then resides in first slot 9201.3b for "B" polarity after boot release 9309.1 rotation.

Figure 28:
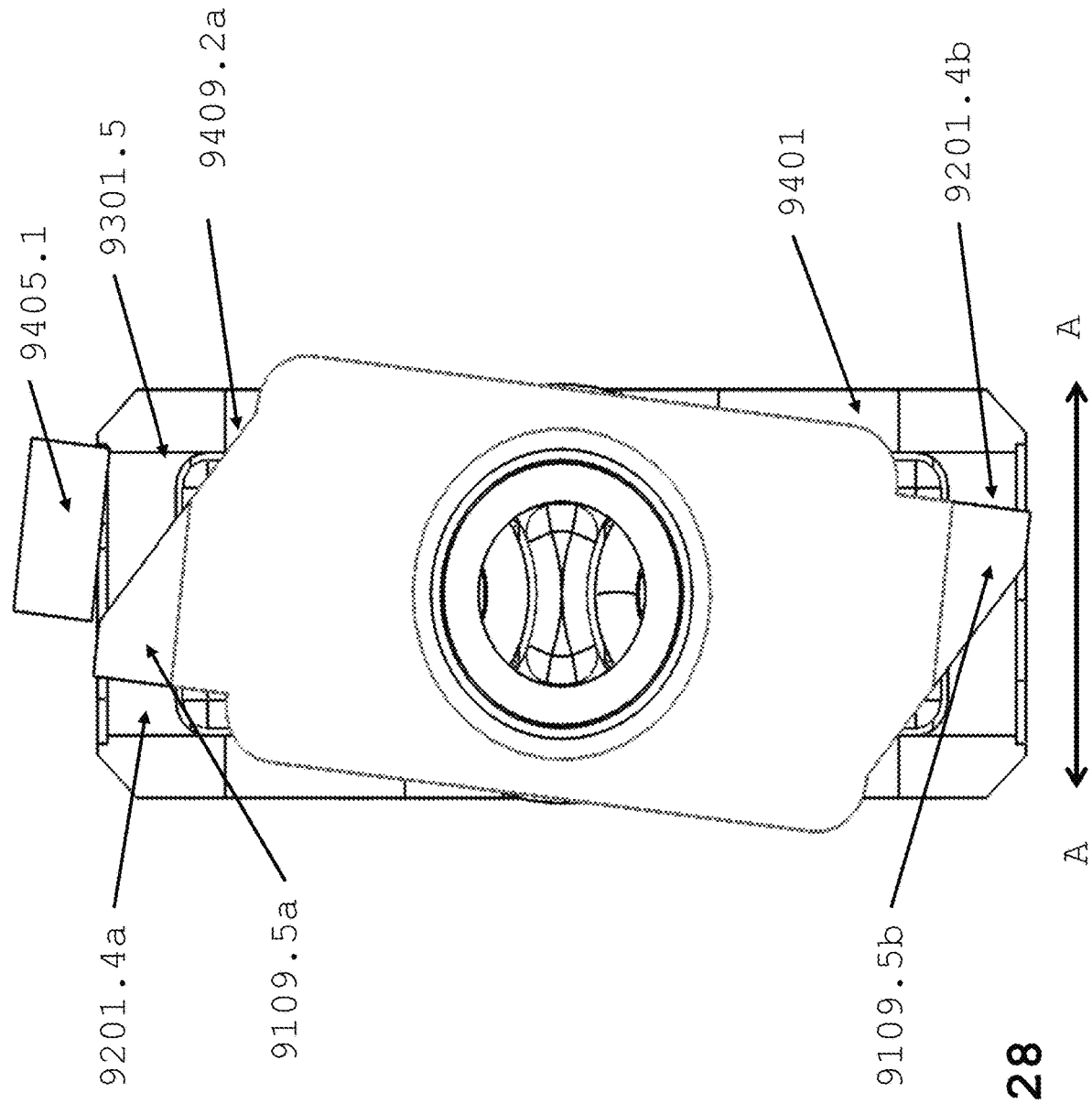
FIG. 28 is perspective view along cross section "A-A" at a start of boot rotation to change a micro connector from a first polarity to a second polarity.

Referring to FIG. 28, rotating of the boot assembly is started and chamfer 9409.2a engages connector housing wall 9301.5 and begins to lift first boot wing 9109.5a out of second slot 9201.4a. Likewise, a second boot wing 9109.5b is rotating out of second slot 9201.4b.

Figure 29:
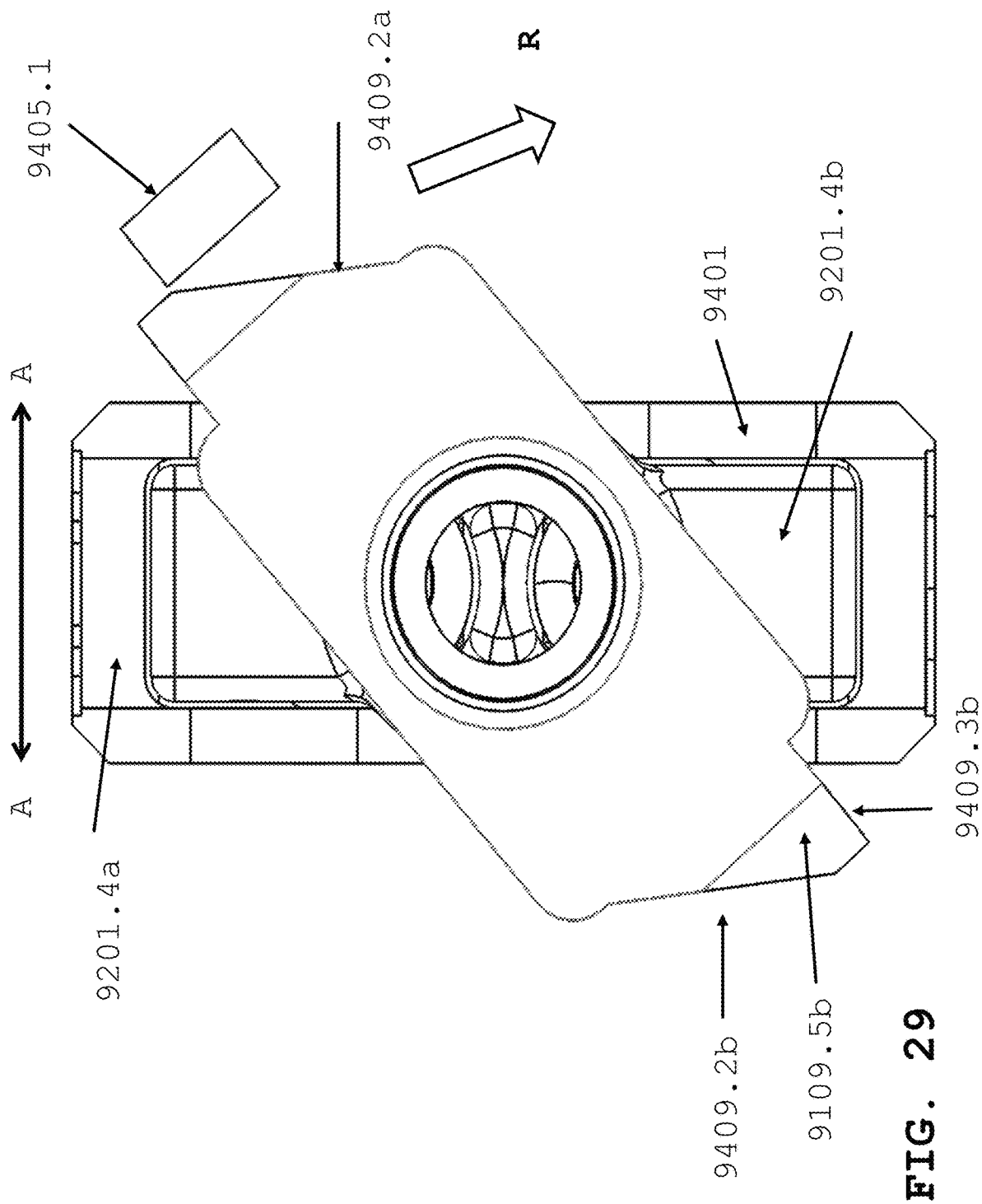
FIG. 29 is perspective view along cross section "A-A" in furtherance of boot rotation to change the micro connector from a first polarity to a second polarity.

Referring to FIG. 29 upon further rotation in direction "R", securing protrusion 9105.2 (refer to FIG. 20) on alignment and offset key 9405.1 is lifted out of first slot 9201.3a (refer to FIG. 20 and FIG. 21), and boot wing 9109.5a is lifted out of second slot 9201.4a at a top surface and upon 180-degree rotation, securing protrusion 9105.2 (refer to FIG. 20) is accepted into first slot 9201.4b at a bottom surface of the outer housing 9401. Boot wing 9109.5b moves out of second slot 9201.4b.

Figure 30:
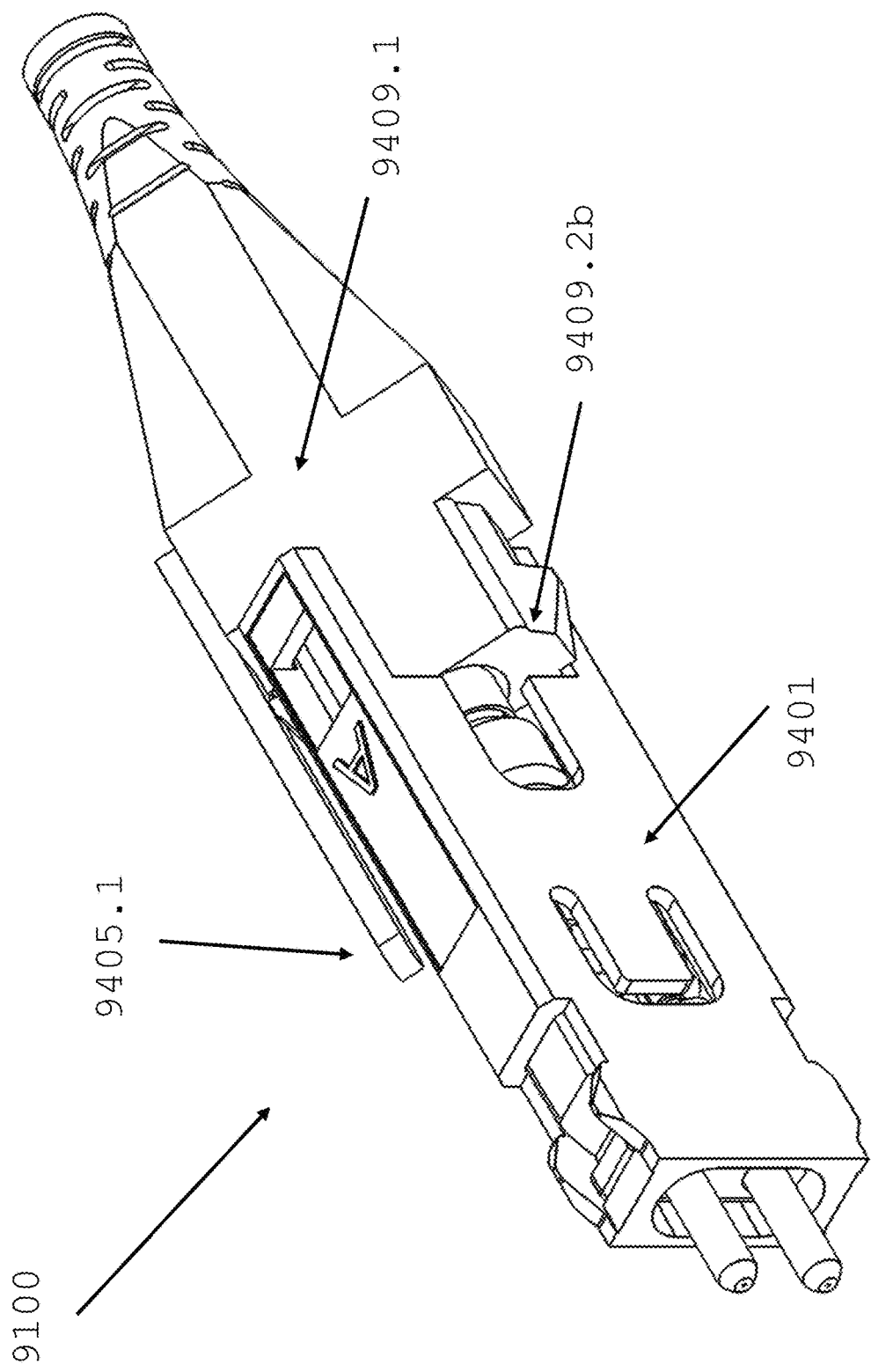
FIG. 30 is a perspective view of the micro connector in furtherance of boot rotation.

Referring to FIG. 30, the rotation of boot assembly 9409.1 is shown as it exits the outer housing 9401 of connector 9100. Chamfer 9409.2b exits first from this view. Alignment and offset key 9405.1 is moving around the outer housing body in a counter-clockwise direction, in this view to a Second Polarity position "B".

Figure 31:
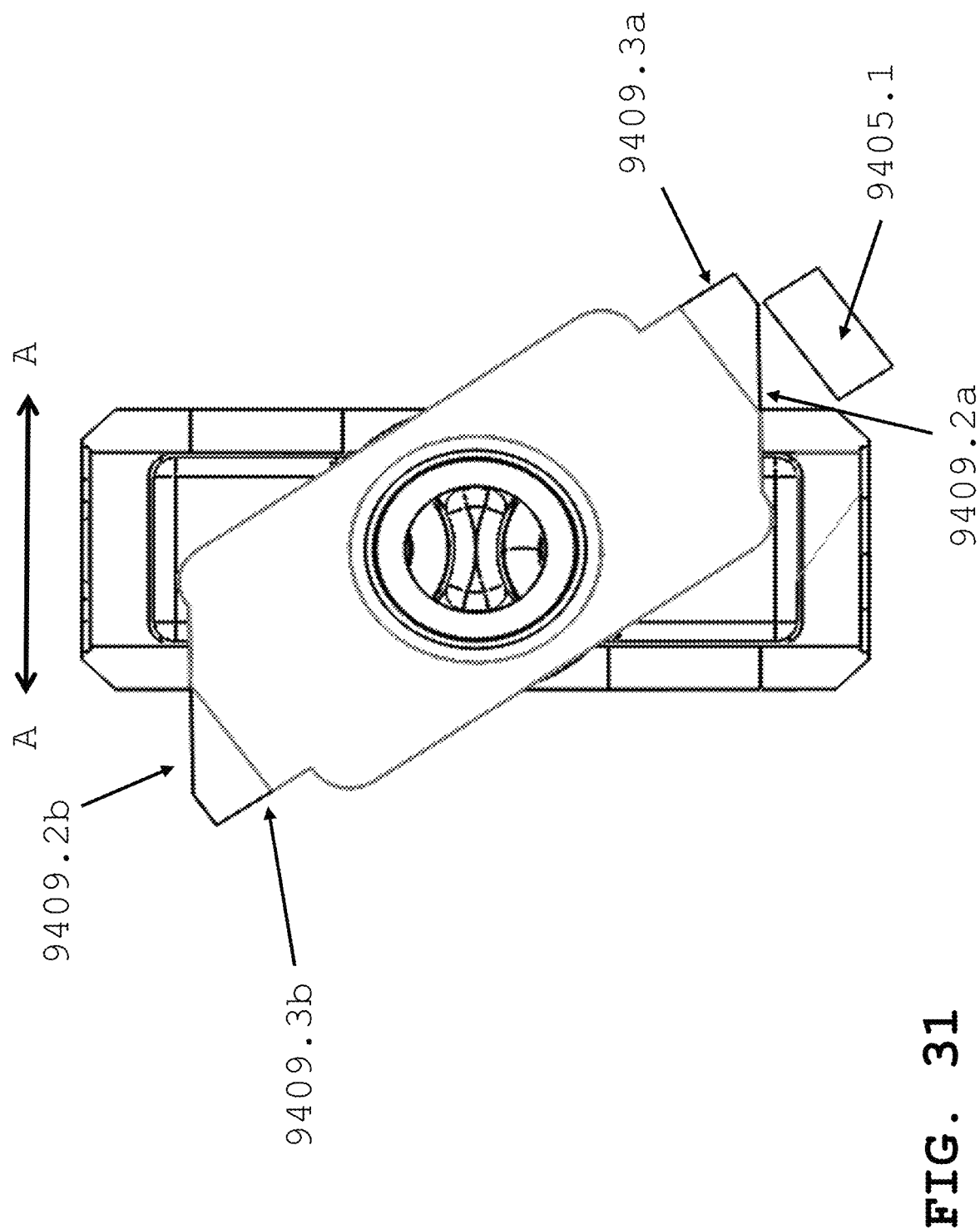
FIG. 31 is a perspective view along cross section "A-A" just prior to completion to a second polarity of the micro connector.
Figure 32:
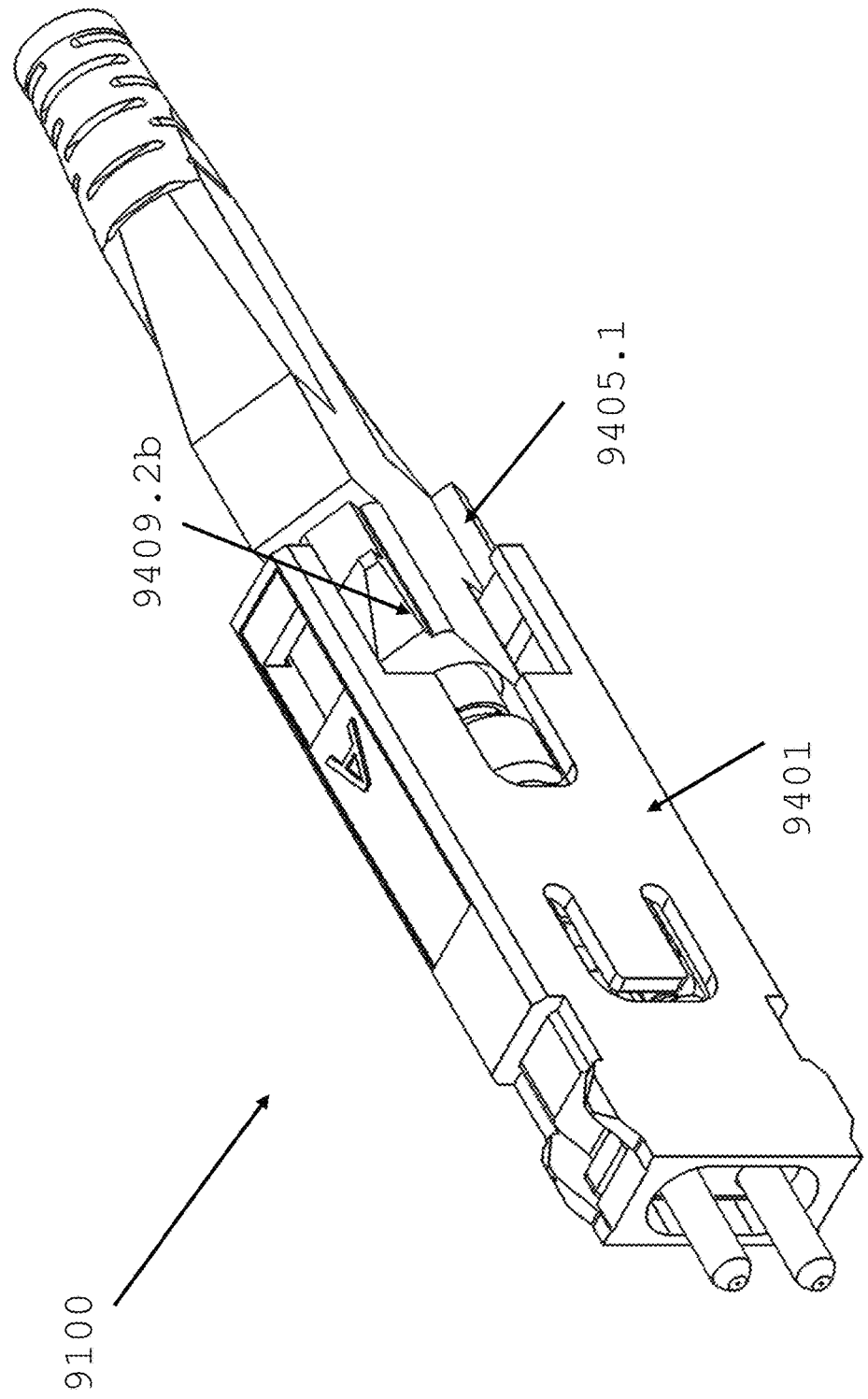
FIG. 32 is a perspective view of the micro connector just prior to completion to a second polarity.
Figure 33:
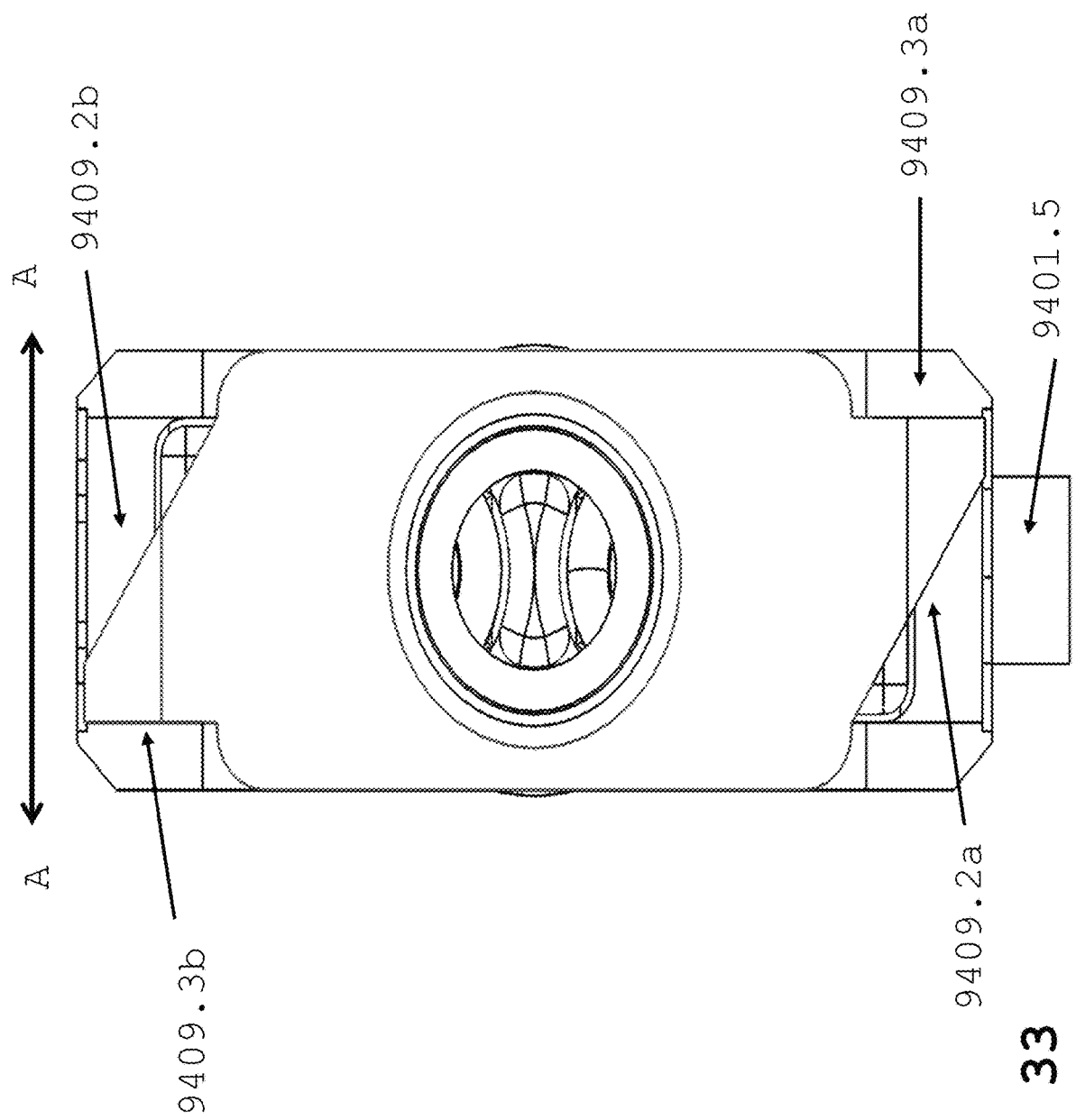
FIG. 33 is a perspective view along cross section "A-A" of micro connector FIG. 16 in a second polarity position.

Referring to FIG. 31, alignment and offset key 9405.1 is almost in a second polarity position as shown, with chamfer 9409.2b in an opposite orientation to itself in FIG. 25. Referring to FIG. 32, connector 9100 shows chamfer 9409.2b in the opposite position to that of FIG. 30, indicating the connector is close to its second polarity configuration with alignment and offset key 9405.1 at bottom surface of outer housing 9401. FIG. 33 depicts connector 9100 along cross section "A-A" in its second polarity position, with chamfer 9409.2b in second slot 9401.4a at the top surface of outer housing 9401. Polarity key 9405.1 is at the bottom surface of outer housing 9401 indicating the connector is in a second polarity configuration.

Figure 34:
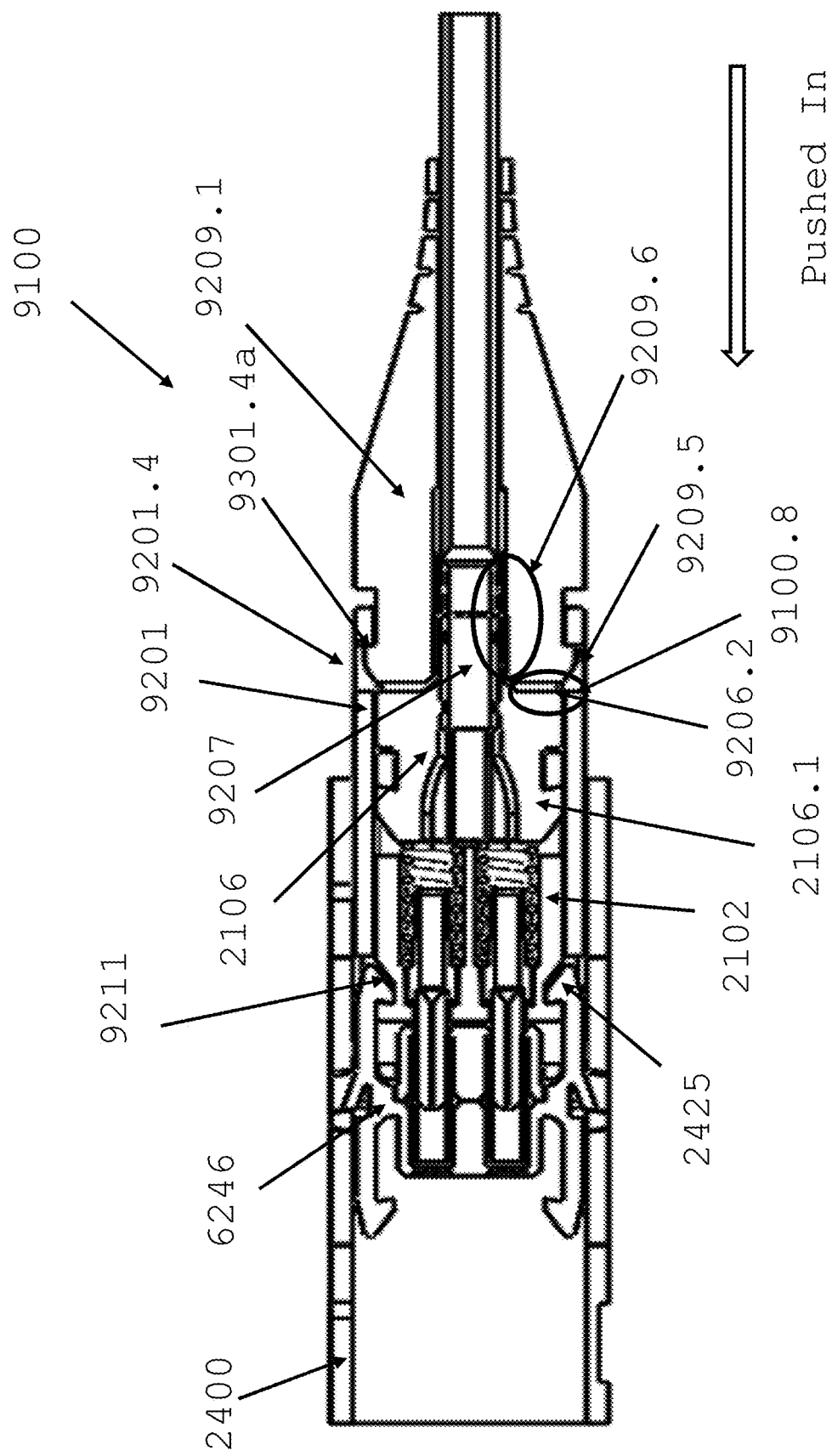

Referring to FIG. 34 a micro connector 9100 is shown along cross section "B-B" (refer to FIG. 24) in a latched position within a receptacle of adapter 2400. During rotation of the multi-purpose rotatable boot assembly 9209.1, boot wing 9209.5 operates as described above in FIGS. 25-33. This is accomplished by gap 9209.6 between boot assembly 9209.1 that allows "free-wheeling" about crimp ring 9207 as inner round 9409.4 engages back post face surface 9406.7 as described in FIGS. 26-27. Rotating boot assembly while connector is in a latched position within adapter, boot assembly wing 9209.5 facing surface is in contact with facing surface 9206.2 of back post 2106, as shown at interface 9100.8. Still referring to FIG. 34, boot wing 9209.5 face engages and releasably locks with corresponding surface 9301.4a of second slot 9201.4 of outer housing 9201, FIG. 18 and FIG. 21. Micro connector 9100 is latched and unlatched in an adapter 2400 receptacle using push/pull boot assembly or push/pull key as described in FIGS. 9-11, or FIGS. 34-36, or FIGS. 37-42. Adapter hook 2425 is seated in connector recess 9211 located in front body 9202. In this position, boot assembly 9209.1 is up against back body 2106 as shown at interface 9100.8, as shown by direction of arrow "Pushed In".

Figure 35:
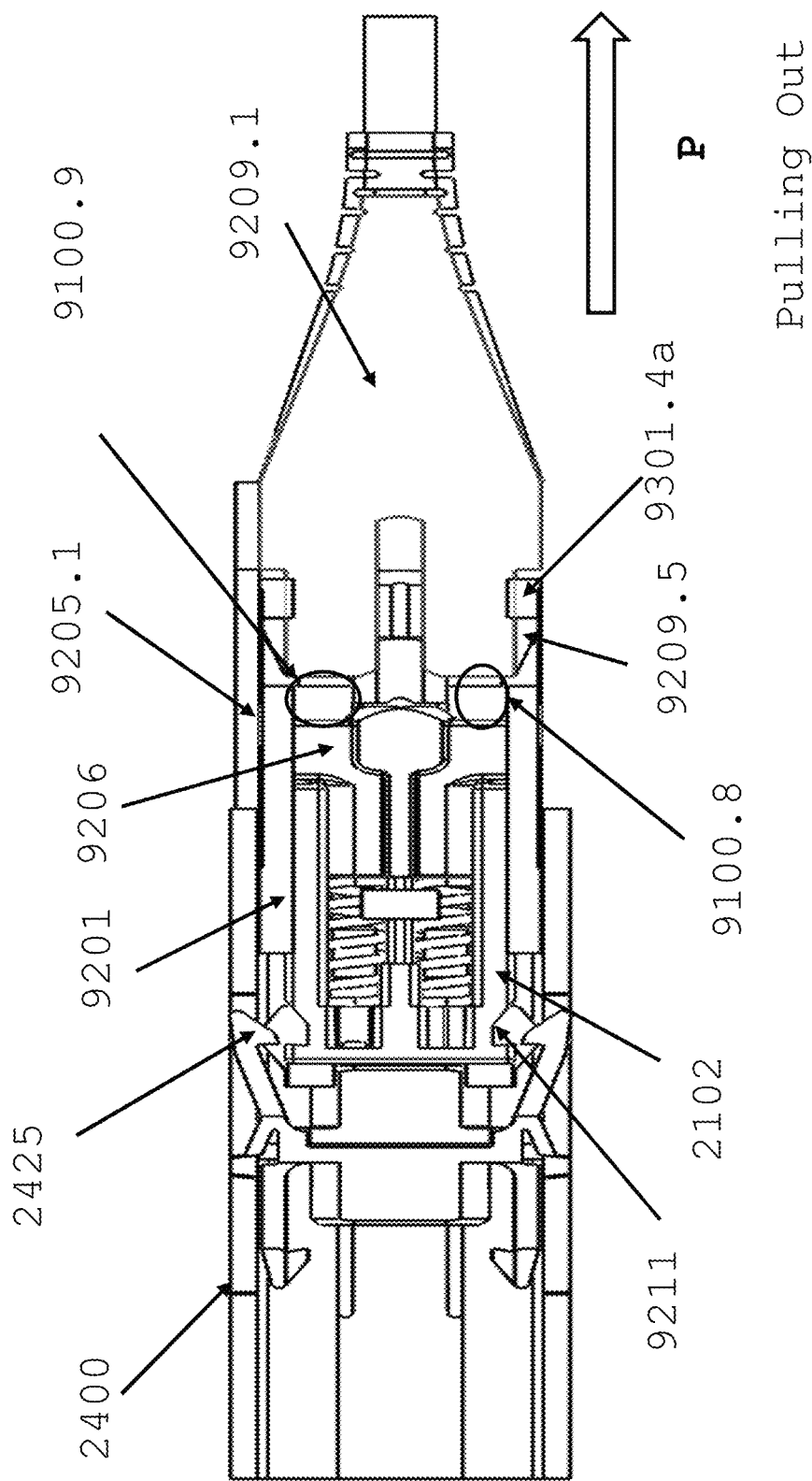
FIG. 35 is a perspective view of FIG. 34 as multi-purpose rotatable boot assembly is partially pulled in direction "P".

Referring to FIG. 35, boot assembly 9209.1 is being pulled rearward in the direction of "P". Boot assembly 9209.1 is pulled a release distance "d" to interface 9100.8, 9100.9 to unlatch connector from adapter interface. At the same time, adapter hook 2425 is being lifted out connector recess 9211 as micro connector 9100 is removed from adapter 2400 receptacle. Boot assembly 9209.1 moves a distance "d" because boot wing 9209.5 engages outer housing face 9301.4a, and pulls outer housing 9201 rearward. Outer housing 9201 is pulled rearward connector 9100 is released from this the amount of separation between the distal end of the back body and proximal end of boot assembly 9209.1. This distance matches channel distance, FIG. 36, 9100.9a, 9100.8a in which boot hooks slide upon pulling connector from adapter using rotatable boot assembly. Hooks 2425 lift out of recess 9211 located at a proximal end of front body 2102, when boot assembly 9209.1 is pulled rearward at least this distance.

Figure 36:
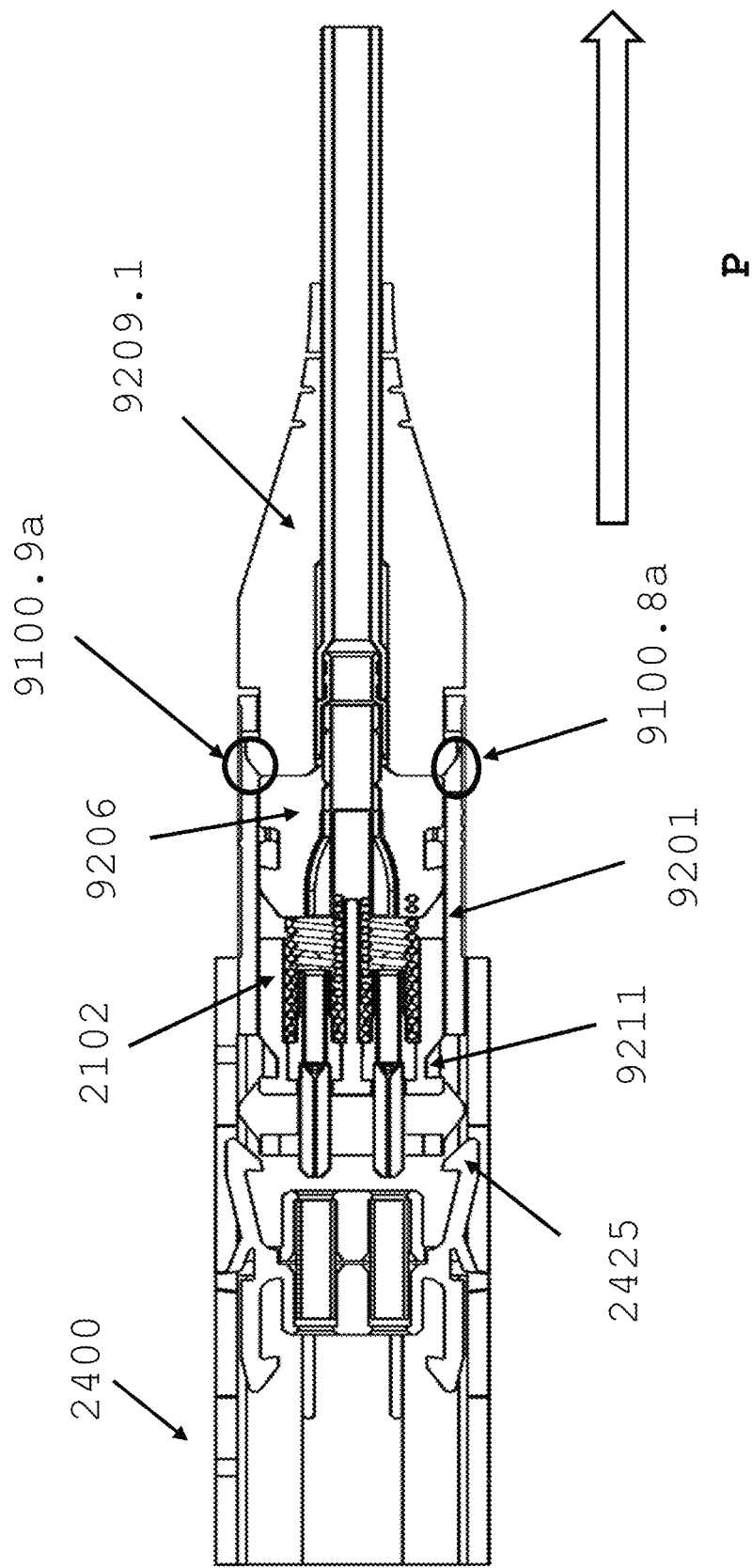
FIG. 36 is a perspective view of FIG. 34 as multi-purpose rotatable boot assembly (FIG. 17) is release from adapter hook but still under influence of pulling force "P".

Referring to FIG. 36, once boot assembly 9209.1 is fully pulled in direction of "P", connector 9100 is released from within adapter 2400. Adapter hook 2425 is completely out of connector recess 9211, and maximum pulling distance. Once the pull force, "P", is release from boot 9209.1, interface distance 9100.8 returns to that of FIG. 34, upon release of pull force "P", on boot assembly 9209.1.

Figure 37:
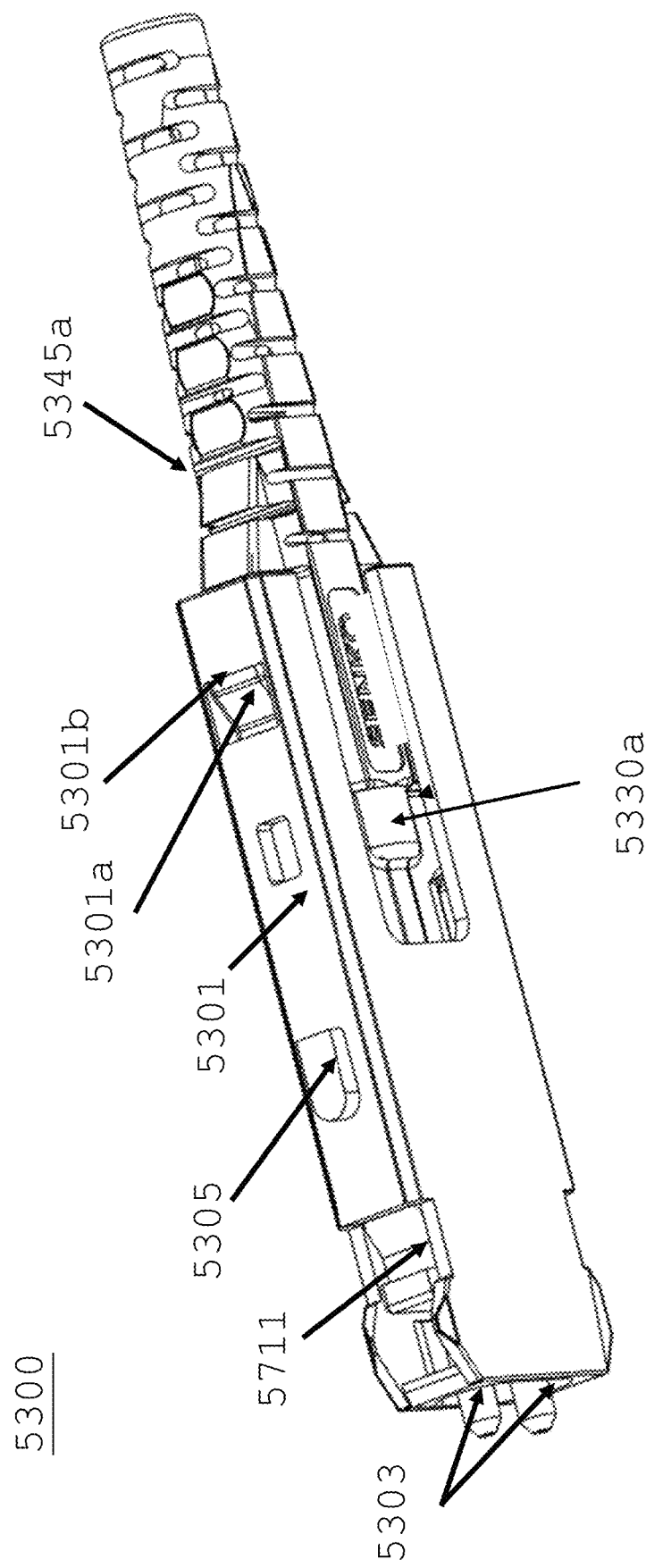
FIG. 37 is perspective view of a micro connector with another push/pull release embodiment incorporated therein.
Figure 41:
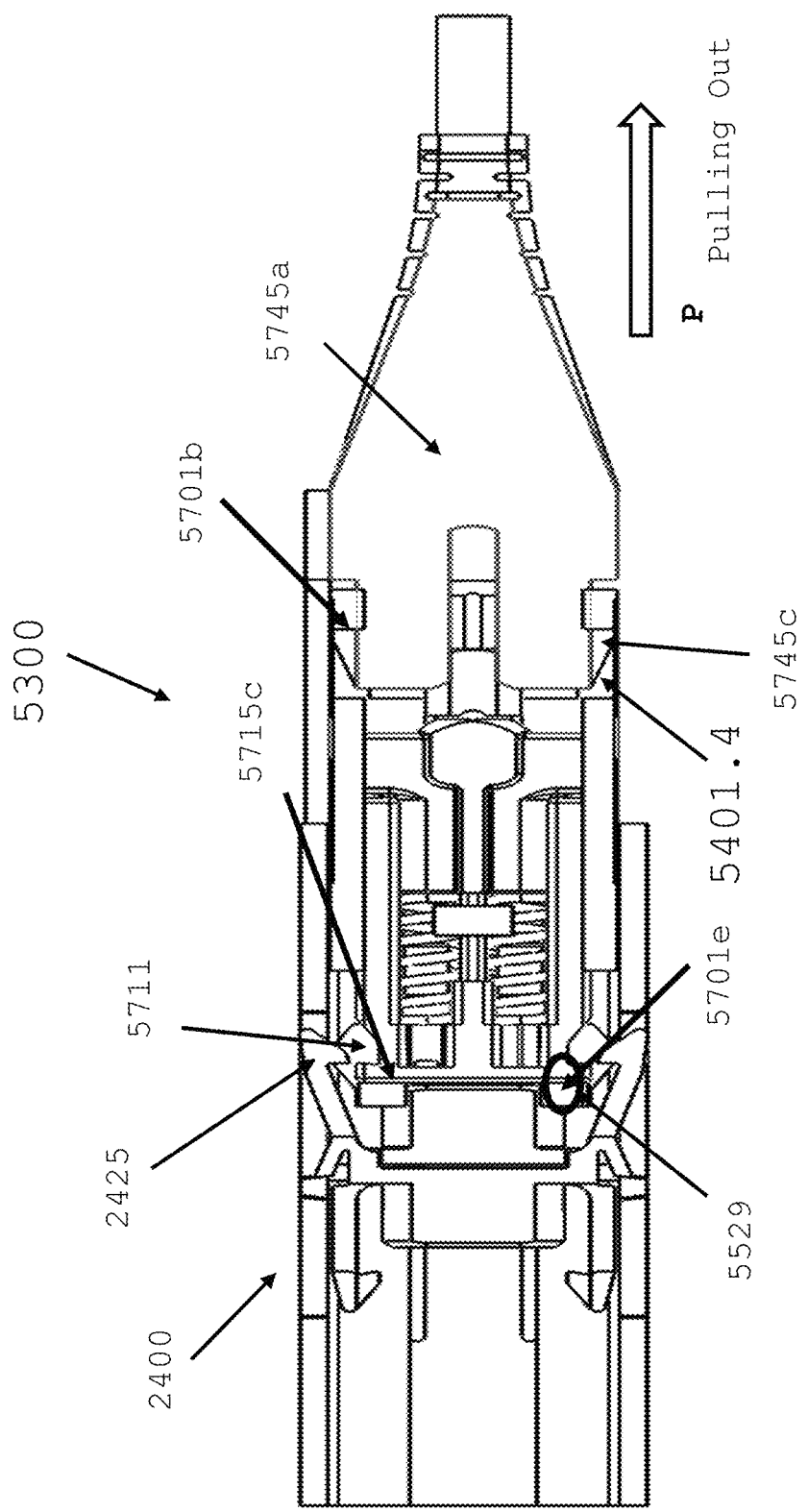
FIG. 41 is a cross-section view of connector of FIG. 37 partial removed using push/pull release boot according to the present invention.

FIG. 37 depicts connector 5300 with push/pull boot assembly 5345a at its distal end receiving a fiber cable with a plural of fiber strands therein, and a proximal end configured to connect and secure to back body assembly 5330a secured with outer housing 5301. Outer housing 5301 has alignment key 5305, further has opening 5301a with stop face 5301b that boot wings (5445b, 5445c) (refer to FIG. 38) engage when boot assembly 5345a is pulled in a distal direction fully to release connector 5300 from a receptacle as shown in FIG. 41, when hook 5425 is removed from recess 5711. Ferrules 5303 provide the Tx, Rx information light signals.

Figure 38:
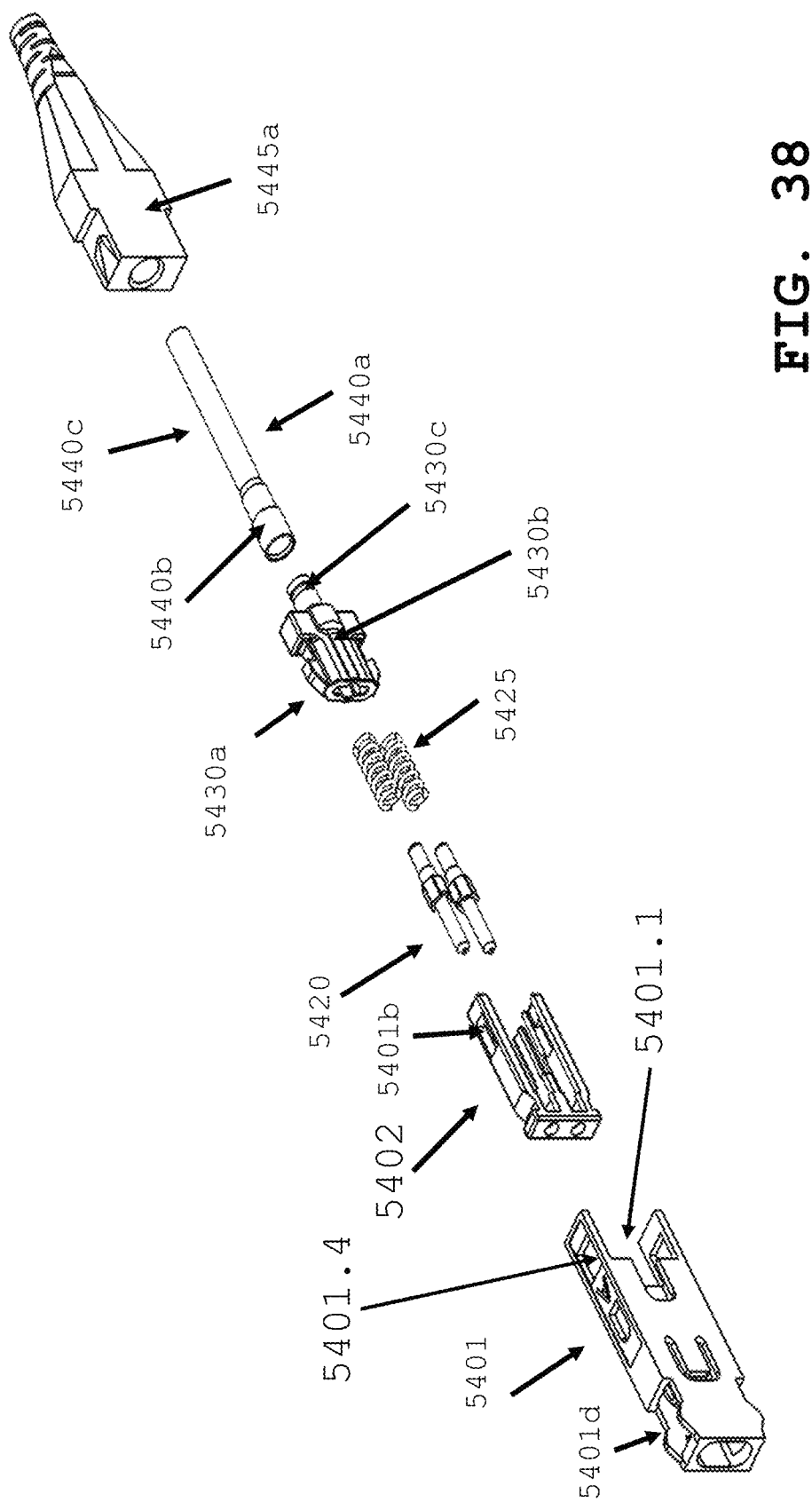
FIG. 38 is an exploded view of FIG. 37 connector.

FIG. 38 depicts an exploded view of connector 5300 of FIG. 37. Boot assembly 5445a accepts crimp ring assembly 5440a having protective tube 5440c covering fiber strands and crimp ring 5440b secured to back post 5430c of back body assembly 5430a including back body 5430b. A pair of springs 5425 are placed over a corresponding ferrule assembly 5420 comprising a ferrule and ferrule flange. The ferrule assembly and springs are held within front body 5402 by back body assembly 5430a, as described for connector 2100. Front body 5402 is inserted into distal opening 5401.1 of outer housing 5401 with boot assembly wing 5430a secured within a distal opening 5415b of front body and wing is secured through opening 5401.4 of outer housing securing outer housing, front body and back body together when assembled with push/pull boot, as depicted in FIG. 37.

Figure 39:
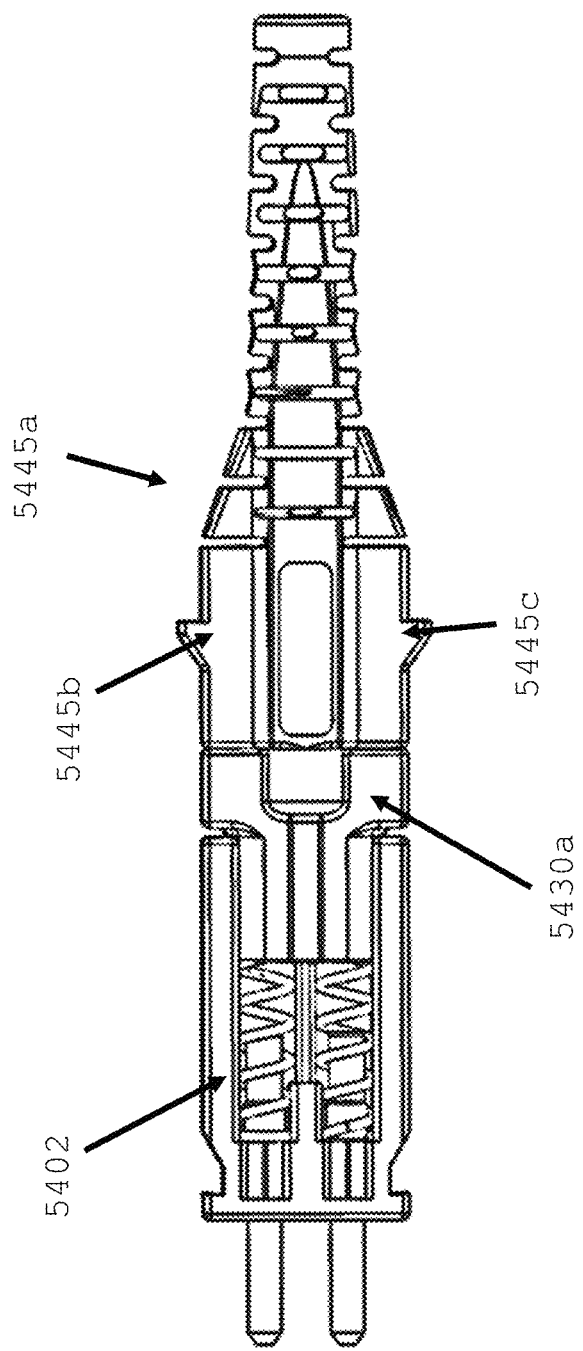
FIG. 39 is a side perspective inner view of a micro connector of FIG. 37 without an outer housing.

FIG. 39 depicts connector of FIG. 37 without its outer housing 5301, in an assembled configuration. Boot assembly 5445a is secured on back post 5430c of back body 5430a via crimp ring 5440a, as described in FIG. 38. Wings (5445b, 5445c) secure FIG. 39 assembly within outer housing 5301, and during release of connector 5300 from a receptacle, wings (5445b, 5445c) pull back outer housing a specific distance "d", which releases adapter/receptacle hook or latch 5625 that is seated in recess 5611 (refer to FIG. 40), while connector 5300 is secured within receptacle 2400. Front body 5402 is secured to connector housing 5401 with back body 5430a secured to a distal end of front body 5402, as described in FIG. 1 and elsewhere in this disclosure.

Figure 40:
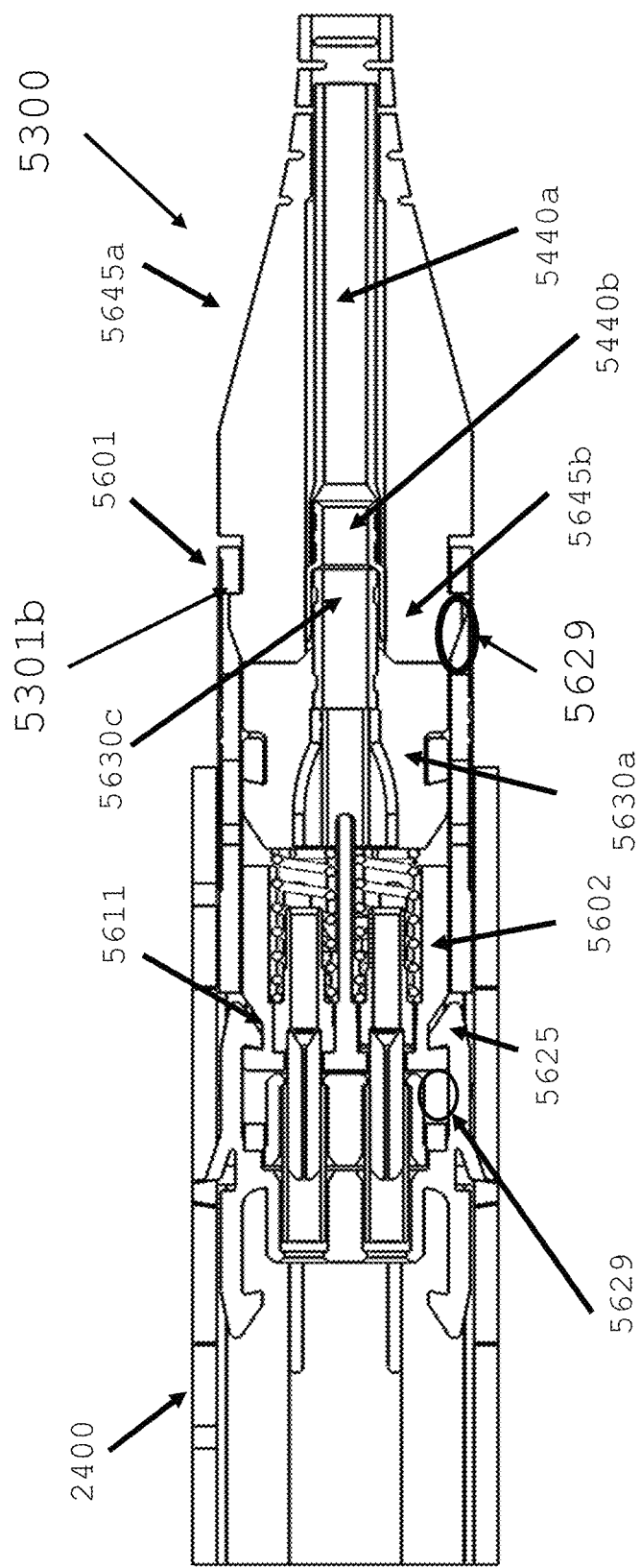
FIG. 40 is a cross-section view of connector of FIG. 37 latched into a receptacle.

FIG. 40 depicts connector 5300 secured within receptacle 2400 of FIG. 24. Receptacle hook or latch 5625 rests in connector recess 5611 formed within front body 5601, at its proximal end. A gap of distance "d" 5629 limits travel of front body 5601 as boot release wing 5645b engages stop face 5301b of outer housing 5601. This "d" travel removes hook 5625 from connector recess 5611 thereby unlatching or releasing connector from adapter 2400. Crimp ring 5440b is shown secured to back post 5630c. Back body 5630a is secured within front body 5402 at distal openings 5401b (FIG. 38).

Figure 42:
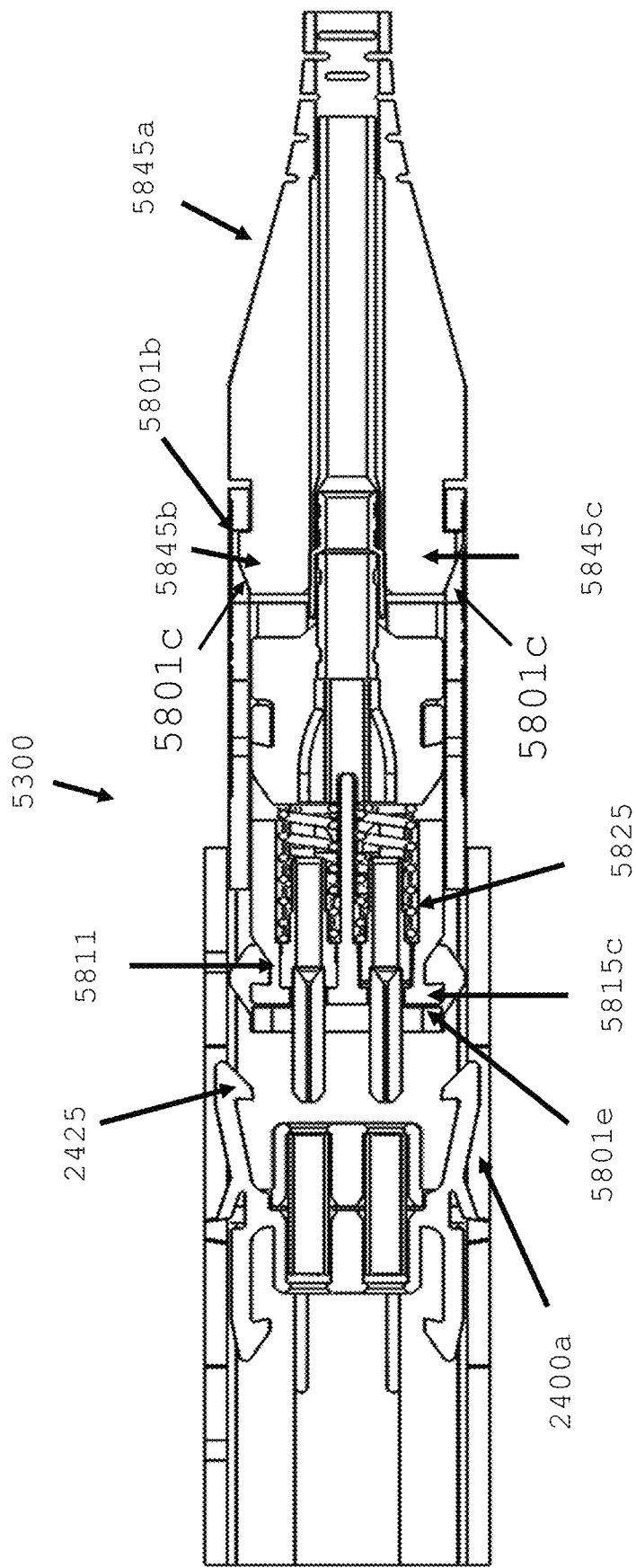
FIG. 42 is a cross-section view of connector of FIG. 37 released from an adapter receptacle.

FIG. 41 depicts connector 5300 being removed or pulled out of receptacle 2400 in direction "P". Hook or latch 2425 within receptacle housing lifts out of recess 5711 along front body ramp 5401d (FIG. 38), as boot assembly 5745a is being pulled rearward or in a distal direction. Gap 5529 is closed as shown in FIG. 41. Inner face of connector housing 5715c is flush with front face of front body 5701e, which stops travel of boot assembly and is configured to ensure adapter latch or hook 2425 is displaced from recess 5711 to release connector from receptacle, as shown in FIG. 42. Boot wing 5745c is secured at a distal end within second slot or opening 5401.4 within connector housing 5401.

FIG. 42 depicts connector 5300 removed from receptacle 2400 using boot assembly 5845a. In this embodiment, wings (5845b, 5845c) are flush with outer housing wall 5801b. Wings (5845b, 5845c) move within gap or opening 5801c within connector housing outer wall, as boot 5845a is pulled rearward to release connector from adapter 2400 as shown. Spring 5825 biases forward front body face 5815c to be flush with front body face 5801e, when pull force is released from boot assembly. Hook or latch 2425 is displaced from recess 5811, and hook resides in adapter housing gap 2400a within outer housing of receptacle 2400. This reduces the overall dimensions of the adapter to accept more connectors.

Referring to FIG. 43, another embodiment of a polarity change is disclosed using alignment and offset key 9600. Alignment and offset key 9600 is releasably attached to boot clip surface 9975 as shown by the dotted line. Attaching key 9600 to a first side of the boot 9209.1, connector 9100 is in first polarity configuration, and attaching key 9600 to a second side, connector 9100 is in a second polarity configuration. Referring to FIG. 44, a first polarity configuration is assembled key 9600 is attached to boot 9209.1 of connector 9100. Referring to FIG. 45, a second polarity configuration is assembled with key 9600 is attached to the opposite side of boot 9209.1.

In the above detailed description, reference is made to the accompanying drawings, which form a part hereof. In the drawings, similar symbols typically identify similar components, unless context dictates otherwise. Other embodiments may be used, and other changes may be made, without departing from the spirit or scope of the subject matter presented herein.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more").

The invention claimed is:

1. A fiber optic connector having a boot, a crimp body, and a housing having at least two optical fibers therein, the fiber optic connector comprising:
   a front end opening in the housing, the housing having a pair of short sides forming a top and a bottom and a pair of long sides joining the top and the bottom, the at least two optical fibers spaced apart between the top and the bottom formed by the pair of short sides, a separation between the top and the bottom is more than a separation between individual ones of the pair of long sides;
   the crimp body positioned rearward of the front end of the housing, the crimp body having a rear portion; and
   the boot receiving the rear portion of the crimp body and having a front extension, the front extension extending towards the front end of the housing and attached to the housing forward of a center portion of the boot, wherein the crimp body and the boot each have a respective contiguous longitudinal opening to accommodate the at least two optical fibers having ends terminated forward of the front end opening of the housing, and
   wherein the longitudinal opening extends through a back portion of the boot rearward of the center portion of the boot;
   wherein the front extension is located on the top of the housing;
   wherein the fiber optic connector is configured to mate with an adapter having a keyway along a first wall of the adapter, the front extension configured to be received in the keyway when the fiber optic connector is mated with the adapter;
   wherein the boot is configured to be displaced rearward relative to the at least two optical fibers to actuate the optical fiber connector for extraction from the adapter, the front extension configured to move rearward in the keyway relative to the at least two optical fibers when the boot is displaced rearward to actuate the optical fiber connector for extraction from the adapter.

2. The fiber optic connector according to claim 1, wherein the back portion has a ribbed structure with openings on an outside surface along a length of the back portion to provide strain relief to the at least two optical fibers.

3. The fiber optic connector according to claim 1, wherein the ends of the at least two fibers are terminated in respective two single fiber ferrules.

4. The fiber optic connector according to claim 3, wherein the two single fiber ferrules have respective front ends exposed forward of the front end opening in the housing.

5. The fiber optic connector according to claim 1, wherein the boot is movable longitudinally relative to the housing upon application of a pull force, and wherein after application of the pull force, the boot and the housing are rotatable relative to each other to change a polarity of the fiber optic connector.

6. The fiber optic connector according to claim 1, wherein the front extension portion has a latch.

7. The fiber optic connector according to claim 1, wherein the center portion of the boot engages the rear portion of the housing.

8. The fiber optic connector according to claim 1, wherein a connection of the boot to the housing in a first relative orientation determines a first polarity of the fiber optic connector and a connection of the boot to the housing in a second relative orientation determines a second polarity of the fiber optic connector.

9. The fiber optic connector according to claim 8, wherein the first relative orientation and the second relative orientation differ by 180° about a longitudinal axis of the fiber optic connector.

10. The fiber optic connector according to claim 1, wherein the back portion has a grasping portion at a rear end of the back portion to allow a user to push and pull on the boot.

11. The fiber optic connector according to claim 1, wherein the boot is slidable relative to the housing.

12. The fiber optic connector according to claim 1, wherein the front extension is an integral part of the center portion.

13. The fiber optic connector according to claim 1, wherein the center portion has sides with cutouts.

14. The fiber optic connector according to claim 1, wherein the top of the housing comprises a recess and the front extension comprises a first portion configured to be received in the recess and a second portion configured to be positioned above the top of the housing when the first portion is received in the recess.

15. A fiber optic connector having a boot, a crimp body, and a housing having two optical fibers terminated respectively within two fiber optic ferrules therein, the fiber optic connector comprising:
   a front end opening in the housing for the two fiber optic ferrules, the housing having a pair of short sides forming a top and a bottom and a pair of long sides joining the top and the bottom, a separation between the top and the bottom is more than a separation between individual ones of the pair of long sides, the two fiber optic ferrules being spaced apart from each other between the top and the bottom but equidistant from each of the pair of long sides;
   the crimp body positioned rearward of the front end of the housing, the crimp body having a rear portion to receive the two optical fibers; and
   the boot receiving the rear portion of the crimp body and having a front extension, the front extension extending towards the front end of the housing and attached to the housing via a latch forward of a center portion of the boot, wherein the crimp body and the boot have a longitudinal opening to accommodate the two optical fibers having ends terminated forward of the front end opening of the housing, and
   wherein the longitudinal opening extends through a back portion of the boot rearward of the center portion of the boot;
   wherein the fiber optic connector is configured to mate with an adapter having a keyway along a first wall of the adapter, the front extension configured to be received in the keyway when the fiber optic connector is mated with the adapter;
   wherein the boot configured to be displaced rearward relative to the at least two optical fibers to actuate the optical fiber connector for extraction from the adapter, the front extension configured to move rearward in the keyway relative to the at least two optical fibers when the boot is displaced rearward to actuate the optical fiber connector for extraction from the adapter;

wherein the boot is movable in relation to the housing and the crimp body from a first position in which front extension is on the top of the housing to a second position in which the front extension is on the bottom of the housing and wherein moving the boot from the first position to the second position changes polarity of the fiber optic connector.

16. The fiber optic connector according to claim 15, wherein the back portion has a ribbed structure with openings on an outside surface along a length of the back portion to provide strain relief to a fiber cable containing the two optical fibers.

17. The fiber optic connector according to claim 15, wherein the boot is movable longitudinally relative to the housing upon application of a pull force, and wherein after application of the pull force, the boot and the housing are rotatable relative to each other to change a polarity of the fiber optic connector.

18. The fiber optic connector according to claim 15, wherein the front extension is an integrally molded with the center portion and has a latch.

19. A fiber optic connector comprising:
a boot;
a crimp body engaged to the boot forward of the boot; and
a housing having two optical fibers terminated respectively within two fiber optic ferrules therein, the housing comprising a front end opening for the two fiber optic ferrules, a pair of short sides forming a top and a bottom and a pair of long sides joining the top and the bottom, a separation between the top and the bottom is more than a separation between individual ones of the pair of long sides, the two fiber optic ferrules being spaced apart from each other between the top and the bottom but equidistant from each of the pair of long sides, wherein the crimp body is positioned rearward of the front end of the housing, the crimp body having a rear portion to receive the two optical fibers, wherein the boot includes:
a center portion having a front end and a back end, a first longitudinal opening extending between the front end and the back end to receive a portion of the crimp body and a fiber optic cable having the two optical fibers,
a back portion attached to the center portion and extending away from the front end of the center portion, the back portion defining a second longitudinal opening that is in communication with the first longitudinal opening, and
a front extension portion connected to the center portion and extending forward and beyond the front end of the center portion, and wherein the boot is movable in relation to the housing and the crimp body from a first position in which front extension is on the top of the housing to a second position in which the front extension is on the bottom of the housing and wherein moving the boot from the first position to the second position changes polarity of the fiber optic connector.

* * * * *